US012394798B2

United States Patent
Feng et al.

(10) Patent No.: US 12,394,798 B2
(45) Date of Patent: Aug. 19, 2025

(54) COMPOSITIONS CONTAINING CONDUCTIVE ADDITIVES, RELATED ELECTRODES AND RELATED BATTERIES

(71) Applicant: Cabot Corporation, Boston, MA (US)

(72) Inventors: Feng Feng, Troy, MI (US); Aurelien DuPasquier, Westford, MA (US); Miodrag Oljaca, Concord, MA (US); Qi Lu, Shanghai (CN); Olha Mashtalir, N. Billerica, MA (US); Kavita K. Pai, Nashua, NH (US)

(73) Assignee: Cabot Corporation, Boston, MA (US)

( * ) Notice: Subject to any disclaimer, the term of this patent is extended or adjusted under 35 U.S.C. 154(b) by 808 days.

(21) Appl. No.: 17/268,737

(22) PCT Filed: Aug. 16, 2019

(86) PCT No.: PCT/CN2019/100906
§ 371 (c)(1),
(2) Date: Feb. 16, 2021

(87) PCT Pub. No.: WO2020/038286
PCT Pub. Date: Feb. 27, 2020

(65) Prior Publication Data
US 2021/0305575 A1    Sep. 30, 2021

Related U.S. Application Data

(60) Provisional application No. 62/719,750, filed on Aug. 20, 2018.

(51) Int. Cl.
| | | |
|---|---|---|
| *H01M 4/62* | (2006.01) | |
| *H01M 4/131* | (2010.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ........... *H01M 4/625* (2013.01); *H01M 4/131* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,629,081 B2 | 12/2009 | Inagaki et al. | |
| 8,241,525 B2 | 8/2012 | Oki et al. | |
| 2016/0118667 A1 | 4/2016 | Blizanac et al. | |
| 2016/0293959 A1* | 10/2016 | Blizanac | H01M 4/625 |
| 2016/0380270 A1* | 12/2016 | Lee | H01M 4/139 |
| | | | 429/232 |
| 2017/0324096 A1* | 11/2017 | Korchev | H01M 4/525 |
| 2018/0366734 A1* | 12/2018 | Korchev | H01M 4/1391 |

FOREIGN PATENT DOCUMENTS

| | | | |
|---|---|---|---|
| CN | 106252712 A | | 12/2016 |
| CN | 108183236 | * | 6/2018 |
| JP | 2005/174655 A | | 6/2005 |
| JP | 2016/162538 A | | 9/2016 |
| JP | 2018/062545 A | | 4/2018 |
| KR | 20150028662 | * | 3/2015 |
| KR | 10-2015-0067049 | | 6/2015 |

OTHER PUBLICATIONS

International Search Report and the Written Opinion of the International Searching Authority, or the Declaration of International Application No. PCT/CN2019/100906, mailed Nov. 20, 2019.

* cited by examiner

*Primary Examiner* — Jonathan Crepeau

(57) ABSTRACT

An electrode includes an electrode composition having carbon nanotubes; carbon black particles having a Brunauer-Emmett-Teller (BET) surface area greater than 90 m²/g, and an oil adsorption number (OAN) greater than 150 mL/100g, wherein the ratio of the carbon nanotubes to the carbon black particles ranges from 3:1 to 0.25:1 by weight; and an electroactive material selected from lithium nickel cobalt manganese oxide or lithium nickel cobalt aluminum oxide; and a current collector contacting the electrode composition. The total concentration of the carbon nanotubes and the carbon black particles is equal to or less than 3 wt % of the electrode composition.

21 Claims, 11 Drawing Sheets

COMPOSITIONS CONTAINING CONDUCTIVE ADDITIVES, RELATED ELECTRODES AND RELATED BATTERIES

CROSS REFERENCE TO RELATED APPLICATION

This application is a § 371 national phase application of and claims the benefit of priority to PCT/CN2019/100906, filed on Aug. 16, 2019, which claims the benefit of priority to U.S. Provisional Patent Application Ser. No. 62/1719,750, filed on Aug. 20, 2018. Both applications are hereby incorporated by reference in its entirety.

FIELD OF THE INVENTION

The invention relates to compositions containing conductive additives, related electrodes, and related batteries.

BACKGROUND

Lithium-ion batteries are commonly used sources of electrical energy for a variety of applications, such as electronic devices and electric vehicles. A lithium-ion battery typically includes a negative electrode (e.g., graphite) and a positive electrode (described below) that allow lithium ions and electrons to move to and from the electrodes during charging and discharging. An electrolyte solution in contact with the electrodes provides a conductive medium in which the ions can move. To prevent direct reaction between the electrodes, an ion-permeable separator is used to physically and electrically isolate the electrodes. When the battery is used as an energy source for a device, electrical contact is made to the electrodes, allowing electrons to flow through the device to provide electrical power, and lithium ions to move through the electrolyte from one electrode to the other electrode.

The positive electrode typically includes a conductive substrate supporting a mixture (e.g., applied as a paste) having at least an electroactive material, a binder, and a conductive additive. The electroactive material, such as a lithium transition metal oxide, is capable of receiving and releasing lithium ions. The binder, such as polyvinylidene fluoride, is used to provide mechanical integrity and stability to the electrode. Typically, since the electroactive material and the binder are electrically poorly conducting or insulating, the conductive additive (e.g., graphite and carbon black) is added to enhance the electrical conductivity of the electrode. The conductive additive and the binder, however, are generally not involved in electrochemical reactions that generate electrical energy, so these materials can negatively affect certain performance characteristics (e.g., capacity and energy density) of the battery since they effectively lower the amount of electroactive material that can be contained in the positive electrode.

SUMMARY

In one aspect, the invention features electrodes, electrode compositions, compositions (e.g., slurries, pastes) that can be used to make electrodes, batteries, and related methods having a combination of carbon black particles and carbon nanotubes as conductive additives.

Applicant has discovered that using a combination of conductive additives, namely, certain carbon black particles and carbon nanotubes, in certain ratios, can enhance the performance of batteries containing certain electroactive materials, namely, lithium nickel cobalt manganese oxide ("NCM") and lithium nickel cobalt aluminum oxide ("NCA"). For example, compared to batteries containing only carbon nanotubes as the conductive additive, the combination of carbon black particles and carbon nanotubes can still provide good electrode conductivity, rate capability and improved low-temperature capacity at reduced costs. Without being bound by theory, it is believed that the carbon black particles and the carbon nanotubes form a three-dimensional conductive network that covers and bridges particles of the electroactive material, thereby providing short-range conductivity among the particles of the electroactive material, and long-range conductivity between the particles of the electroactive material and the current collector.

In another aspect, the invention features an electrode, including: an electrode composition having carbon nanotubes; carbon black particles having a Brunauer-Emmett-Teller (BET) surface area greater than 90 $m^2/g$, and an oil adsorption number (OAN) greater than 150 mL/100 g, wherein the ratio of the carbon nanotubes to the carbon black particles ranges from 3:1 to 0.25:1 by weight; and an electroactive material selected from the group consisting of lithium nickel cobalt manganese oxide and lithium nickel cobalt aluminum oxide, wherein the total concentration of the carbon nanotubes and the carbon black particles is equal to or less than 3 wt % of the electrode composition; and a current collector contacting the electrode composition.

Embodiments of the invention may include one or more of the following features. The total concentration of the carbon nanotubes and the carbon black particles ranges from 0.5 to 2 wt % of the electrode composition. The ratio of the carbon nanotubes to the carbon black particles ranges from 2.3:1 to 0.4:1 by weight. The electrode includes from 90 to 99 wt % of the electroactive material. The electroactive material includes lithium nickel cobalt manganese oxide. The carbon nanotubes have one or both of the following properties: a diameter greater than 4 nm; and/or a length greater than 5 micrometers. The carbon nanotubes have one or both of the following properties: a diameter less than 50 nm; and/or a length less than 20 micrometers. The carbon nanotubes have one or both of the following properties: a diameter ranging from 4 to 50 nm; and/or a length ranging from 5 to 20 micrometers.

The carbon black particle may include one or more of the following features. The carbon black particles have a BET surface area less than 400 $m^2/g$. The carbon black particles have an OAN less than 250 mL/100 g. The carbon black particles have a surface energy less than 5 $mJ/m^2$. The carbon black particles have an La crystallite size, as determined by Raman spectroscopy, ranging from 50 Å to 100 Å. The carbon black particles have an Lc crystallite size, as determined by X-ray diffraction, ranging from 50 Å to 100 Å. The carbon black particles have a % crystallinity (($I_G$/($I_G$+$I_D$))×100%), as determined by Raman spectroscopy, ranging from 35% to 70%. The carbon black particles have an aggregate size distribution, as indicated by D50 values of particle size distributions, ranging from 20 to 400 nm. The carbon black particles have one, two, three, four, five, six, or seven of the following properties, in any combination: a surface energy less than 5 $mJ/m^2$; an La crystallite size, as determined by Raman spectroscopy, greater than 50 Å; an Lc crystallite size, as determined by X-ray diffraction, greater than 50 Å; % crystallinity (($I_G$/($I_G$+$I_D$))×100%), as determined by Raman spectroscopy, greater than 35%; an STSA greater than 50 $m^2/g$; an aggregate size distribution, as indicated by D50 values of particle size distributions, greater than 20 nm; and/or an oxygen content from 0 to 0.1 wt %. The carbon black particles have one, two, three, four, five, or six of the following properties, in any combination: an La crystallite size, as determined by Raman spectroscopy, less than 100 Å; an Lc crystallite size, as determined by X-ray diffraction, less than 100 Å; % crystallinity (($I_G/(I_G+I_D)$)×100%), as determined by Raman spectroscopy, less than 70%; an STSA less than 250 m$^2$/g; an aggregate size distribution, as indicated by D50 values of particle size distributions, less than 400 nm; and/or an oxygen content from 0 to 0.1 wt %. The carbon black particles have one, two, three, four, five, or six of the following properties, in any combination: an La crystallite size, as determined by Raman spectroscopy, ranging from 50 Å to 100 Å; an Lc crystallite size, as determined by X-ray diffraction, ranging from 50 Å to 100 Å; a % crystallinity (($I_G/(I_G+I_D)$)×100%), as determined by Raman spectroscopy, ranging from 35% to 70%; an STSA ranging from 50 to 250 m$^2$/g; an aggregate size distribution, as indicated by D50 values of particle size distributions, ranging from 20 to 400 nm; and/or oxygen content from 0 to 0.1 wt %.

In another aspect, the invention features a battery including an electrode described herein.

In another aspect, the invention features a composition, including: carbon nanotubes; carbon black particles having a Brunauer-Emmett-Teller (BET) surface area greater than 90 m$^2$/g, and an oil adsorption number (OAN) greater than 150 mL/100 g, wherein the ratio of the carbon nanotubes to the carbon black particles ranges from 3:1 to 0.25:1 by weight; and a liquid medium.

Embodiments of may include one or more of the following features. The ratio of the carbon nanotubes to the carbon black particles ranges from 2.3:1 to 0.4:1 by weight. The carbon nanotubes have one or both of the following properties: a diameter greater than 4 nm; and/or a length greater than 5 micrometers. The carbon nanotubes have one or both of the following properties: a diameter less than 50 nm; and/or a length less than 20 micrometers. The carbon nanotubes have one or both of the following properties: a diameter ranging from 4 to 50 nm; and/or a length ranging from 5 to 20 micrometers. The liquid medium is selected from the group consisting of N-methylpyrrolidone (NMP), acetone, an alcohol, and water. The composition further includes a dispersant.

The carbon black particle may include one or more of the following features. The carbon black particles have a BET surface area less than 400 m$^2$/g. The carbon black particles have an OAN less than 250 mL/100 g. The carbon black particles have a surface energy less than 5 mJ/m$^2$. The carbon black particles an La crystallite size, as determined by Raman spectroscopy, ranging from 50 Å to 100 Å. The carbon black particles have an Lc crystallite size, as determined by X-ray diffraction, ranging from 50 Å to 100 Å. The carbon black particles have a % crystallinity (($I_G/(I_G+I_D)$)×100%), as determined by Raman spectroscopy, ranging from 35% to 70%. The carbon black particles have an aggregate size distribution, as indicated by D50 values of particle size distributions, ranging from 20 to 400 nm. The carbon black particles have one, two, three, four, five, six, or seven of the following properties, in any combination: a surface energy less than 5 mJ/m$^2$; an La crystallite size, as determined by Raman spectroscopy, greater than 50 Å; an Lc crystallite size, as determined by X-ray diffraction, greater than 50 Å; % crystallinity (($I_G/(I_G+I_D)$)×100%), as determined by Raman spectroscopy, greater than 35%; an STSA greater than 50 m$^2$/g; an aggregate size distribution, as indicated by D50 values of particle size distributions, greater than 20 nm; and/or an oxygen content from 0 to 0.1 wt %. The carbon black particles have one, two, three, four, five, or six of the following properties, in any combination: an La crystallite size, as determined by Raman spectroscopy, less than 100 Å; an Lc crystallite size, as determined by X-ray diffraction, less than 100 Å; % crystallinity (($I_G/(I_G+I_D)$)×100%), as determined by Raman spectroscopy, less than 70%; an STSA less than 250 m$^2$/g; an aggregate size distribution, as indicated by D50 values of particle size distributions, less than 400 nm; and/or an oxygen content from 0 to 0.1 wt %. The carbon black particles have one, two, three, four, five, or six of the following properties, in any combination: an La crystallite size, as determined by Raman spectroscopy, ranging from 50 Å to 100 Å; an Lc crystallite size, as determined by X-ray diffraction, ranging from 50 Å to 100 Å; a % crystallinity (($I_G/(I_G+I_D)$)×100%), as determined by Raman spectroscopy, ranging from 35% to 70%; an STSA ranging from 50 to 250 m$^2$/g; an aggregate size distribution, as indicated by D50 values of particle size distributions, ranging from 20 to 400 nm; and/or oxygen content from 0 to 0.1 wt %.

In another aspect, the invention features a method comprising: using the composition described herein to make an electrode or a battery. The method can include combining lithium nickel cobalt manganese oxide and lithium nickel cobalt aluminum oxide with the composition. The method can include combining lithium nickel cobalt manganese oxide with the composition. The electrode can be one described herein.

Unless expressly indicated otherwise, all percentages herein are weight percentages.

Other aspects, features, and advantages of the invention will be apparent from the description of the embodiments thereof and from the claims.

DETAILED DESCRIPTION OF THE EMBODIMENTS

Figure 1:
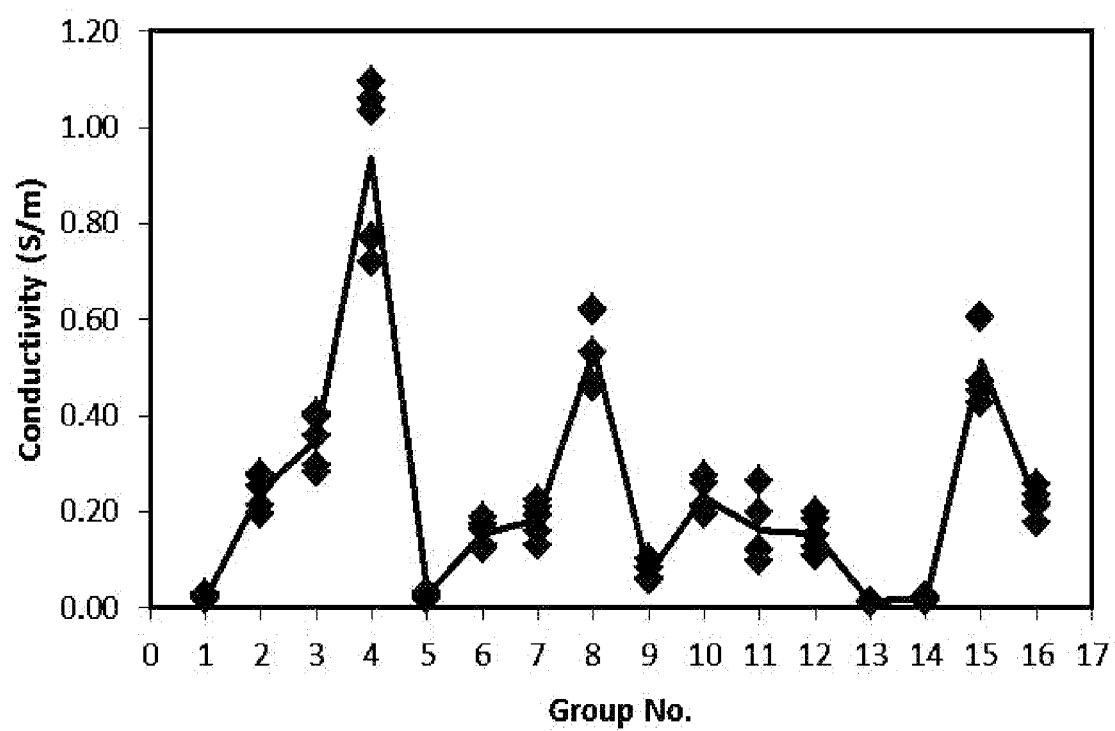
FIG. 1 is a plot showing the through-plane conductivity of sixteen cathode formulations with $Li_{1+x}(Ni_{0.33}Co_{0.33}Mn_{0.33})_{1-x}O_2$ ("NCM111").

Described herein are compositions (e.g., slurries) that can be used to produce electrodes for batteries (e.g., lithium ion batteries), methods of making the compositions, and applications of the compositions in electrodes (e.g., cathodes) and batteries.

The compositions typically include a combination of carbon black particles and carbon nanotubes and a liquid medium (e.g., N-methylpyrrolidone (NMP)). The compositions can be combined with lithium nickel cobalt manganese oxide ("NCM") or lithium nickel cobalt aluminum oxide ("NCA"), with or without a binder (e.g., poly(vinyldifluoroethylene) (PVDF)), to form an electrode composition that can be applied to a current collector to form an electrode, which can be used to produce a battery.

In certain embodiments, the carbon black particles are characterized by their surface areas and oil adsorption numbers (i.e., structure). The carbon black particles can have a relatively wide range of total surface areas. Without being bound by theory, it is believed that, during use of a battery, there are chemical side reactions that can occur within the battery that degrade its performance. Having particles with lower surface areas can enhance the performance of the battery by providing fewer surface sites where these unwanted side reactions can occur. However, the surface areas of the particles should be balanced, i.e., high enough, so that the particles can sufficiently cover and/or bridge the NCM or NCA and provide the desired electrode conductivity. In some embodiments, the carbon black particles have a Brunauer-Emmett-Teller (BET) surface area greater than or equal to 90 $m^2/g$, or less than or equal to 400 $m^2/g$, for example, ranging from 90 to 400 $m^2/g$. The BET surface area can have or include, for example, one of the following ranges: from 90 to 375 $m^2/g$, or from 90 to 350 $m^2/g$, or from 90 to 325 $m^2/g$, or from 90 to 300 $m^2/g$, or from 90 to 275 $m^2/g$, or from 90 to 250 $m^2/g$, or from 90 to 225 $m^2/g$, or from 90 to 200 $m^2/g$, or from 90 to 175 $m^2/g$, or from 90 to 150 $m^2/g$, or from 90 to 125 $m^2/g$, or from 125 to 400 $m^2/g$, or from 125 to 375 $m^2/g$, or from 125 to 350 $m^2/g$, or from 125 to 325 $m^2/g$, or from 125 to 300 $m^2/g$, or from 125 to 275 $m^2/g$, or from 125 to 250 $m^2/g$, or from 125 to 225 $m^2/g$, or from 125 to 200 $m^2/g$, or from 125 to 175 $m^2/g$, or from 125 to 150 $m^2/g$, or from 150 to 400 $m^2/g$, or from 150 to 375 $m^2/g$, or from 150 to 350 $m^2/g$, or from 150 to 325 $m^2/g$, or from 150 to 300 $m^2/g$, or from 150 to 275 $m^2/g$, or from 150 to 250 $m^2/g$, or from 150 to 225 $m^2/g$, or from 150 to 200 $m^2/g$, or from 150 to 175 $m^2/g$, or from 175 to 400 $m^2/g$, or from 175 to 375 $m^2/g$, or from 175 to 350 $m^2/g$, or from 175 to 325 $m^2/g$, or from 175 to 300 $m^2/g$, or from 175 to 275 $m^2/g$, or from 175 to 250 $m^2/g$, or from 175 to 225 $m^2/g$, or from 175 to 200 $m^2/g$, or from 200 to 400 $m^2/g$, or from 200 to 375 $m^2/g$, or from 200 to 350 $m^2/g$, or from 200 to 325 $m^2/g$, or from 200 to 300 $m^2/g$, or from 200 to 275 $m^2/g$, or from 200 to 250 $m^2/g$, or from 200 to 225 $m^2/g$, or from 225 to 400 $m^2/g$, or from 225 to 375 $m^2/g$, or from 225 to 350 $m^2/g$, or from 225 to 325 $m^2/g$, or from 225 to 300 $m^2/g$, or from 225 to 275 $m^2/g$, or from 225 to 250 $m^2/g$, or from 250 to 400 $m^2/g$, or from 250 to 375 $m^2/g$, or from 250 to 350 $m^2/g$, or from 250 to 325 $m^2/g$, or from 250 to 300 $m^2/g$, or from 250 to 275 $m^2/g$, or from 275 to 400 $m^2/g$, or from 275 to 375 $m^2/g$, or from 275 to 350 $m^2/g$, or from 275 to 325 $m^2/g$, or from 275 to 300 $m^2/g$, or from 300 to 400 $m^2/g$, or from 300 to 375 $m^2/g$, or from 300 to 350 $m^2/g$, or from 300 to 325 $m^2/g$, or from 325 to 400 $m^2/g$, or from 325 to 375 $m^2/g$, or from 325 to 350 $m^2/g$, or from 350 to 400 $m^2/g$, or from 350 to 375 $m^2/g$, or from 375 to 400 $m^2/g$. The BET surface area can have or include, for example, one of the following ranges: greater than or equal to 100 $m^2/g$, or greater than or equal to 125 $m^2/g$, or greater than or equal to 150 $m^2/g$, or greater than or equal to 175 $m^2/g$, or greater than or equal to 200 $m^2/g$, or greater than or equal to 225 $m^2/g$, or greater than or equal to 250 $m^2/g$, or greater than or equal to 275 $m^2/g$, or greater than or equal to 300 $m^2/g$, or greater than or equal to 325 $m^2/g$, or greater than or equal to 350 $m^2/g$, or greater than or equal to 375 $m^2/g$, or less than or equal to 375 $m^2/g$, or less than or equal to 350 $m^2/g$, or less than or equal to 325 $m^2/g$, or less than or equal to 300 $m^2/g$, or less than or equal to 275 $m^2/g$, or less than or equal to 250 $m^2/g$, or less than or equal to 225 $m^2/g$, or less than or equal to 200 $m^2/g$, or less than or equal to 175 $m^2/g$, or less than or equal to 150 $m^2/g$, or less than or equal to 125 $m^2/g$, or less than or equal to 100 $m^2/g$. Other ranges within these ranges are possible. All BET surface area values disclosed herein refer to BET nitrogen surface area and are determined by ASTM D6556-10, the entirety of which is incorporated herein by reference.

As with the BET surface areas, the carbon black particles can have a range of statistical thickness surface areas (STSAs), with the difference, if any, between BET surface area and STSA being indicative of the porosity of the particles. In some embodiments, the carbon black particles have STSAs greater than or equal to 50 $m^2/g$, or less than or equal to 200 $m^2/g$, for example, ranging from 50 to 200 $m^2/g$. The STSAs can have or include, for example, one of the following ranges: from 50 to 175 $m^2/g$, or from 50 to 150 $m^2/g$, or from 50 to 125 $m^2/g$, or from 50 to 100 $m^2/g$, or from 50 to 75 $m^2/g$, or from 75 to 200 $m^2/g$, or from 75 to 175 $m^2/g$, or from 75 to 150 $m^2/g$, or from 75 to 125 $m^2/g$, or from 75 to 100 $m^2/g$, or from 100 to 200 $m^2/g$, or from 100 to 175 $m^2/g$, or from 100 to 150 $m^2/g$, or from 100 to 125 $m^2/g$, or from 125 to 200 $m^2/g$, or from 125 to 175 $m^2/g$, or from 125 to 150 $m^2/g$, or from 150 to 200 $m^2/g$, or from 150 to 175 $m^2/g$, or from 175 to 200 $m^2/g$. The STSAs can have or include, for example, one of the following ranges: greater than or equal to 75 $m^2/g$, or greater than or equal to 100 $m^2/g$, or greater than or equal to 125 $m^2/g$, or greater than or equal to 150 $m^2/g$, or greater than or equal to 175 $m^2/g$, or less than or equal to 175 $m^2/g$, or less than or equal to 150 $m^2/g$, or less than or equal to 125 $m^2/g$, or less than or equal to 100 $m^2/g$, or less than or equal to 75 $m^2/g$. Other ranges within these ranges are possible. Statistical thickness surface area is determined by ASTM D6556-10 to the extent that such determination is reasonably possible since in some cases heat treatment of some carbon black particles (described below) can affect the ability to determine STSA.

As with the BET surface areas and STSAs, the carbon black particles can have a range of oil absorption numbers (OANs), which are indicative of the particles' structures, or volume-occupying properties. For a given mass, high structure carbon black particles can occupy more volume than other carbon black particles having lower structures. When used as a conductive additive in a battery electrode, carbon black particles having relatively high OANs can provide a continuously electrically-conductive network (i.e., percolate) throughout the electrode at relatively lower loadings. Consequently, more NCM or NCA material can be used, thereby improving the performance of the battery. In some embodiments, the carbon black particles have OANs greater than or equal to 150 mL/100 g, or less than or equal to 250 mL/100 g, for example, ranging from 150 to 250 mL/100 g. The OANs can have or include, for example, one of the following ranges: from 150 to 230 mL/100 g, or from 150 to 210 mL/100 g, or from 150 to 190 mL/100 g, or from 150 to 170 mL/100 g, or from 170 to 250 mL/100 g, or from 170 to 230 mL/100 g, or from 170 to 210 mL/100 g, or from 170 to 190 mL/100 g, or from 190 to 250 mL/100 g, or from 190 to 230 mL/100 g, or from 190 to 210 mL/100 g, or from 210 to 250 mL/100 g, or from 210 to 230 mL/100 g, or from 230 to 250 mL/100 g. The OAN can have or include, for example, one of the following ranges: greater than or equal to 170 mL/100 g, or greater than or equal to 190 mL/100 g, or greater than or equal to 210 mL/100 g, or greater than or equal to 230 mL/100 g, or less than or equal to 230 mL/100 g, or less than or equal to 210 mL/100 g, or less than or equal to 190 mL/100 g, or less than or equal to 170 mL/100 g. Other ranges within these ranges are possible. All OAN values cited herein are determined by the method described in ASTM D 2414-16.

In addition to having the BET surface areas, STSAs, and OANs described herein, the carbon black particles can further have one or more (e.g., two, three, four, five, or six) of the following properties described herein, in any combination, including a surface energy as described herein, an La crystallite size as described herein; an Lc crystallite size as described herein; a % crystallinity as described herein; an aggregate size distribution as described herein; and/or an oxygen content as described herein.

In some embodiments, the carbon black particles are generally highly graphitized carbon black particles, as indicated by their low surface energies, among other things. Lower surface energy values are indicative of higher degrees of graphitization and can be associated with lower amounts of residual impurities on the surface of carbon black particles, and thus, their hydrophobicity. Without being bound by theory, it is believed that, up to a threshold purity level, purer particles can provide improved electrical conductivity and reduced likelihood of side reactions, thereby improving the performance of the particles. Surface energy can be measured by Dynamic Vapor (Water) Sorption (DVS) or water spreading pressure (described below). In some embodiments, the carbon black particles have a surface energy (SE or SEP) less than or equal to 5 mJ/m$^2$, e.g., from the detection limit (about 2 mJ/m$^2$) to 5 mJ/m$^2$. The surface energy can have or include, for example, one of the following ranges: from the detection limit to 4 mJ/m$^2$, or from the detection limit to 3 mJ/m$^2$. In certain embodiments, the surface energy, as measured by DWS, is less than or equal to 4 mJ/m$^2$, or less than or equal to 3 mJ/m$^2$. Other ranges within these ranges are possible.

Water spreading pressure is a measure of the interaction energy between the surface of carbon black (which absorbs no water) and water vapor. The spreading pressure is measured by observing the mass increase of a sample as it adsorbs water from a controlled atmosphere. In the test, the relative humidity (RH) of the atmosphere around the sample is increased from 0% (pure nitrogen) to about 100% (water-saturated nitrogen). If the sample and atmosphere are always in equilibrium, the water spreading pressure (Te) of the sample is defined as:

$$\pi_e = \frac{RT}{A} \int_o^{P_o} \Gamma d\ln P$$

where R is the gas constant, T is the temperature, A is the BET surface area of the sample as described herein, $\Gamma$ is the amount of adsorbed water on the sample (converted to moles/gm), P is the partial pressure of water in the atmosphere, and Po is the saturation vapor pressure in the atmosphere. In practice, the equilibrium adsorption of water on the surface is measured at one or (preferably) several discrete partial pressures and the integral is estimated by the area under the curve.

The procedure for measuring the water spreading pressure is detailed in "Dynamic Vapor Sorption Using Water, Standard Operating Procedure", rev. Feb. 8, 2005 (incorporated in its entirety by reference herein), and is summarized here. Before analysis, 100 mg of the carbon black to be analyzed was dried in an oven at 125° C. for 30 minutes. After ensuring that the incubator in the Surface Measurement Systems DVS1 instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 10-12 mg of carbon black was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 0, 5, 10, 20, 30, 40, 50, 60, 70, 80, 90, and 95% RH, with the system allowed to equilibrate for 20 minutes at each RH level. The mass of water adsorbed at each humidity level was recorded, from which water spreading pressure was calculated (see above). The measurement was done twice on two separate samples and the average value is reported.

Alternatively or additionally to having the surface energies described herein, in certain embodiments, the carbon black particles have a crystallite size that indicates a relatively high degree of graphitization. A higher degree of graphitization correlates with certain crystalline domains as shown by higher La crystallite size values, as determined by Raman spectroscopy, where La is defined as 43.5× (area of G band/area of D band). Raman measurements of La were based on Gruber et al., "Raman studies of heat-treated carbon blacks," Carbon Vol. 32 (7), pp. 1377-1382, 1994, which is incorporated herein by reference. The Raman spectrum of carbon includes two major "resonance" bands or peaks at about 1340 cm-1 and 1580 cm-1, denoted as the "D" and "G" bands, respectively. It is generally considered that the D band is attributed to disordered sp$^2$ carbon, and the G band to graphitic or "ordered" sp$^2$ carbon. Using an empirical approach, the ratio of the G/D bands and an La measured by X-ray diffraction (XRD) are highly correlated, and regression analysis gives the empirical relationship:

$L_a$=43.5×(area of G band/area of D band), in which $L_a$ is calculated in Angstroms. Thus, a higher $L_a$ value corresponds to a more ordered crystalline structure.

In some embodiments, the carbon black particles have an $L_a$ crystallite size of greater than or equal to 50 Å, or less than or equal to 100 Å, for example, from 50 Å to 100 Å. The $L_a$ crystallite size can have or include, for example, one of the following ranges: from 50 to 90 Å, or from 50 to 80 Å, or from 50 to 70 Å, or from 50 to 60 Å, or from 60 to 100 Å, or from 60 to 90 Å, or from 60 to 80 Å, or from 60 to 70 Å, or from 70 to 100 Å, or from 70 to 90 Å, or from 70 to 80 Å, or from 80 to 100 Å, or from 80 to 90 Å, or from 90 to 100 Å. In certain embodiments, the $L_a$ crystallite size is less than or equal to 90 Å, or less than or equal to 80 Å, or less than or equal to 70 Å, or less than or equal to 60 Å. In some embodiments, the $L_a$ crystallite size is greater than or equal to 60 Å, or greater than or equal to 70 Å, or greater than or equal to 80 Å, or greater than or equal to 90 Å.

The crystalline domains can be further characterized by an Lc crystallite size. The Lc crystallite size was determined by X-ray diffraction using an X-ray diffractometer (PANalytical X'Pert Pro, PANalytical B.V.), with a copper tube, tube voltage of 45 kV, and a tube current of 40 mA. A sample of carbon black particles was packed into a sample holder (an accessory of the diffractometer), and measurement was performed over angle (2θ) range of 10° to 80°, at a speed of 0.14°/min. Peak positions and full width at half maximum values were calculated by means of the software of the diffractometer. For measuring-angle calibration, lanthanum hexaboride ($LaB_6$) was used as an X-ray standard. From the measurements obtained, the Lc crystallite size was determined using the Scherrer equation:

$$L_c(Å)=K*\lambda/(\beta*\cos\theta),$$

where K is the shape factor constant (0.9); 2 is the wavelength of the characteristic X-ray line of Cu $K_{\alpha 1}$ (1.54056 Å); β is the peak width at half maximum in radians; and θ is determined by taking half of the measuring angle peak position (2θ).

A higher Lc value corresponds to a more ordered crystalline structure. In some embodiments, the carbon black particles have an Lc crystallite size of less than or equal 100 Å, or greater than or equal to 50 Å, for example, from 50 Å to 100 Å. The Lc crystallite size can have or include, for example, one of the following ranges: from 50 to 90 Å, or from 50 to 80 Å, or from 50 to 70 Å, or from 50 to 60 Å, or from 60 to 100 Å, or from 60 to 90 Å, or from 60 to 80 Å, or from 60 to 70 Å, or from 70 to 100 Å, or from 70 to 90 Å, or from 70 to 80 Å, or from 80 to 100 Å, or from 80 to 90 Å, or from 90 to 100 Å. In certain embodiments, the Lc crystallite size is less than or equal to 90 Å, or less than or equal to 80 Å, or less than or equal to 70 Å, or less than or equal to 60. In some embodiments, the Lc crystallite size is greater than or equal to 60 Å, or greater than or equal to 70 Å, or greater than or equal to 80 Å, or greater than or equal to 90 Å.

In various embodiments, the carbon black particles have a high degree of graphitization, as indicated by a high % crystallinity, which is obtained from Raman measurements as a ratio of the area of the G band and the areas of G and D bands ($I_G/(I_G+I_D)$). A high % crystallinity can be achieved by using a high heat treatment temperature and, in some embodiments, a longer heat treatment time (described below). In certain embodiments, the carbon black particles have % crystallinities (($I_G/(I_G+I_D)$)×100%) ranging from 35% to 70%, as determined by Raman spectroscopy. The % crystallinity (($I_G/(I_G+I_D)$)×100%) can have or include, for example, one of the following ranges: from 35% to 65%, or from 35% to 60%, or from 35% to 55%, or from 35% to 50%, or from 35% to 45%, or from 35% to 40%, or from 45% to 70%, or from 45% to 65%, or from 45% to 60%, or from 45% to 55%, or from 45% to 50%, or from 55% to 70%, or from 55% to 65%, or from 55% to 60%, or from 60% to 70%, or from 60% to 65%, or from 65% to 70%. The % crystallinity (($I_G/(I_G+I_D)$)×100%) can have or include, for example, one of the following ranges: greater than 35%, or greater than 40%, or greater than 45%, or greater than 50%, or greater than 55%, or greater than 60%, or greater than 65%, or less than 70%, or less than 65%, or less than 60%, or less than 55%, or less than 50%, or less than 45%, or less than 40%. Raman measurements were made using a Horiba LabRAM Aramis Raman microscope and the accompanying LabSpec6 software.

Independently of the properties described herein, in some embodiments, the carbon black particles have an aggregate size distribution, as indicated by their D50 values (also known as the "mass median diameter") of their particle size distributions, that is greater than or equal to 20 nm, or less than or equal to 400 nm, e.g., ranging from 20 nm to 400 nm. Without being bound by theory, it is believed that, for a given structure (e.g., as indicated by an OAN) and mass, a smaller aggregate size is indicative of a higher number of particles, which can improve conductivity. It is believed that carbon black particles having the aggregate size distribution disclosed herein are capable of improving conductivity. The D50 values can have or include, for example, one of the following ranges: from 20 to 350 nm, or from 20 to 300 nm, or from 20 to 250 nm, or from 20 to 200 nm, or from 20 to 150 nm, or from 20 to 100 nm, or from 50 to 400 nm, or from 50 to 350 nm, or from 50 to 300 nm, or from 50 to 250 nm, or from 50 to 200 nm, or from 50 to 150 nm, or from 100 to 400 nm, or from 100 to 350 nm, or from 100 to 300 nm, or from 100 to 250 nm, or from 100 to 200 nm, or from 150 to 400 nm, or from 150 to 350 nm, or from 150 to 300 nm, or from 150 to 250 nm, or from 200 to 400 nm, or from 200 to 350 nm, or from 200 to 300 nm, or from 250 to 400 nm, or from 250 to 350 nm, or from 300 to 400 nm. The D50 values can have or include, for example, one of the following ranges: greater than or equal to 50 nm, or greater than or equal to 100 nm, or greater than or equal to 150 nm, or greater than or equal to 200 nm, or greater than or equal to 250 nm, or greater than or equal to 300 nm, or greater than or equal to 350 nm, or less than or equal to 350 nm, or less than or equal to 300 nm, or less than or equal to 250 nm, or less than or equal to 200 nm, or less than or equal to 150 nm, or less than or equal to 100 nm, or less than or equal to 50 nm. Particle size distribution measurements to determine the D-values disclosed herein were performed using a differential centrifugal sedimentation (DCS) method. The DCS method was performed using a disc centrifuge (CPS Instruments, Model DC24000) and an ultrasonic processor (Branson, Model 450D with a half-inch probe tip). Dispersion samples were prepared by sonicating compositions each containing 0.02 g carbon black and 50 mL dispersion fluid (75% v/v water, 25% v/v ethanol and 0.05% w/v Triton X100 surfactant) at an amplitude of 60% for ten minutes. Instrument settings included a particle density of 1.86; a refractive index of 1.84; an absorptivity of 0.85; and a non-sphericity of 1.0. Run conditions included a disc speed of 24K rpm; a gradient of 24 to 8% sucrose in deionized water (14.4 ml); a gradient density of 1.045; a gradient refractive index of 1.345; a gradient viscosity of 1.25 cP; and a calibration standard of 237 nm polystyrene (density 1.385).

The carbon black particles can have a relatively low oxygen content, which can be indicative of the particles' purity and electrical conductivity properties. In some embodiments, the carbon black has an oxygen content of less than or equal to 0.1 wt %, or less than or equal to 0.06 wt % %, or less than or equal to 0.03 wt %, for example, from 0 to 0.1 wt %. The oxygen content can have or include, for example, one of the following ranges: from 0.01 to 0.1 wt %, or from 0.01 to 0.06 wt %, or from 0.03 to 0.1 wt %, or from 0.03 to 0.06 wt %, or from 0.06 to 0.1 wt %. The oxygen content can be determined by inert gas fusion in which a sample of carbon black particles are exposed to very high temperatures (e.g., about 3000° C.) under inert gas conditions. The oxygen in the sample reacts with carbon to form CO and $CO_2$, which can be monitored by a non-dispersive infrared technique. The total oxygen content is reported in weight percent relative to the total weight of the sample. Various oxygen analyzers based on the inert gas fusion methods are known in the art and commercially available, for example a LECO® TCH600 analyzer.

In various embodiments, the carbon black particles are heat-treated carbon black particles. "Heat-treated carbon black particles" are carbon black particles that have undergone a "heat treatment," which as used herein, generally refers to a post-treatment of base carbon black particles that had been previously formed, e.g., by a furnace black process. The heat treatment can occur under inert conditions (i.e., in an atmosphere substantially devoid of oxygen), and typically occurs in a vessel other than that in which the base carbon black particles were formed. Inert conditions include, but are not limited to, a vacuum, and an atmosphere of inert gas, such as nitrogen, argon, and the like. In some embodiments, the heat treatment of carbon black particles under inert conditions is capable of reducing the number of impurities (e.g., residual oil and salts), defects, dislocations, and/or discontinuities in carbon black crystallites and/or increasing the degree of graphitization.

The heat treatment temperatures can vary. In various embodiments, the heat treatment (e.g., under inert conditions) is performed at a temperature of at least 1000° C., or at least 1200° C., or at least 1400° C., or at least 1500° C., or at least 1700° C., or at least 2000° C. In some embodiments, the heat treatment is performed at a temperature ranging from 1000° C. to 2500° C., e.g., from 1400° C. to 1600° C. Heat treatment performed at a temperature refers to one or more temperature ranges disclosed herein, and can involve heating at a steady temperature, or heating while ramping the temperature up or down, either stepwise and/or otherwise.

The heat treatment time periods can vary. In certain embodiments, the heat treatment is performed for at least 15 minutes, e.g., at least 30 minutes, or at least 1 hour, or at least 2 hours, or at least 6 hours, or at least 24 hours, or any of these time periods up to 48 hours, at one or more of the temperature ranges disclosed herein. In some embodiments, the heat treatment is performed for a time period ranging from 15 minutes to at least 24 hours, e.g., from 15 minutes to 6 hours, or from 15 minutes to 4 hours, or from 30 minutes to 6 hours, or from 30 minutes to 4 hours.

Generally, the heat treatment is performed until one or more desired properties of the carbon black particles (e.g., surface energy) are produced. As an example, during initial periods of heat treatment, test samples of heat treated particles can be removed, and their surface energies can be measured. If the measured surface energies are not as desired, then various heat treatment process parameters (such as heat treatment temperature and/or residence time) can be adjusted until the desired surface energy is produced.

The carbon black particles can also be commercially-available particles. Examples of carbon black particles include LITX® 50, LITX® 66, LITX® 200, LITX® 300 and LITX® HP carbon black particles available from Cabot Corporation; C-NERGY™ C45, C-NERGY™ C65 and SUPER PR products from Imerys; Li-400, Li-250, Li-100 and Li-435 products from Denka; and the EC300 product from Ketjen.

Carbon nanotubes are known in the art as carbonaceous material that include at least one sheet of $sp^2$-hybridized carbon atoms bonded to each other to form a honey-comb lattice that forms a cylindrical or tubular structure. The carbon nanotubes can be single-walled carbon nanotubes or multi-walled carbon nanotubes.

The average diameters of the carbon nanotubes are typically greater than or equal to 4 nm, or less than or equal to 50 nm, for example, ranging from 4 to 50 nm. The diameter can have or include, for example, one of the following ranges: from 4 to 50 nm, or from 4 to 45 nm, or from 4 to 40 nm, or from 4 to 35 nm, or from 4 to 30 nm, or from 4 to 25 nm, or from 4 to 20 nm, or from 4 to 15 nm, or from 4 to 10 nm, or from 10 to 50 nm, or from 10 to 45 nm, or from 10 to 40 nm, or from 10 to 35 nm, or from 10 to 30 nm, or from 10 to 25 nm, or from 10 to 20 nm, or from 15 to 50 nm, or from 15 to 45 nm, or from 15 to 40 nm, or from 15 to 35 nm, or from 15 to 30 nm, or from 15 to 25 nm, or from 20 to 50 nm, or from 20 to 45 nm, or from 20 to 40 nm, or from 20 to 35 nm, or from 20 to 30 nm, or from 25 to 50 nm, or from 25 to 45 nm, or from 25 to 40 nm, or from 25 to 35 nm, or from 30 to 40 nm. The diameter can have or include, for example, one of the following ranges: greater than or equal to 10 nm, or greater than or equal to 15 nm, or greater than or equal to 20 nm, or greater than or equal to 25 nm, or greater than or equal to 30 nm, or greater than or equal to 35 nm, or greater than or equal to 40 nm, or greater than or equal to 45 nm, or less than or equal to 45 nm, or less than or equal to 40 nm, or less than or equal to 35 nm, or less than or equal to 30 nm, or less than or equal to 25 nm, or less than or equal to 20 nm, or less than or equal to 15 nm, or less than or equal to 10 nm. Other ranges within these ranges are possible. The diameter is determined by scanning electron microscopy (SEM), e.g., from randomly selected particles (n=100).

The average lengths of the carbon nanotubes are typically greater than or equal to 5 micrometers, or less than or equal to 200 micrometers, for example, ranging from 5 to 200 micrometers. The length can have or include, for example, one of the following ranges: from 5 to 150 micrometers, or from 5 to 100 micrometers, or from 5 to 50 micrometers, or from 5 to 40 micrometers, or from 5 to 30 micrometers, or from 5 to 20 micrometers, or from 10 to 150 micrometers, or from 10 to 100 micrometers, or from 10 to 50 micrometers, or from 50 to 200 micrometers, or from 50 to 150 micrometers, or from 50 to 100 micrometers, or from 100 to 200 micrometers, or from 100 to 150 micrometers, or from 150 to 200 micrometers. The length can have or include, for example, one of the following ranges: greater than or equal to 5 micrometers, or greater than or equal to 10 micrometers, or greater than or equal to 50 micrometers, or greater than or equal to 75 micrometers, or greater than or equal to 100 micrometers, or greater than or equal to 125 micrometers, or greater than or equal to 150 micrometers, or greater than or equal to 175 micrometers, or less than or equal to 175 micrometers, or less than or equal to 150 micrometers, or less than or equal to 125 micrometers, or less than or equal to 100 micrometers, or less than or equal to 75 micrometers, or less than or equal to 50 micrometers, or less than or equal to 40 micrometers, or less than or equal to 30 micrometers, or less than or equal to 20 micrometers, or less than or equal to 10 micrometers. Other ranges within these ranges are possible. The length is determined by SEM, e.g., from randomly selected particles (n=100).

Examples of carbon nanotubes are LB101, LB 107, and LB116 products from CNano Technology Ltd.; HX-N1, HX-N2 and HX-N6 products from Haoxin Technology; NTP 3003, NTP 3021, NTP 3103, and NTP 3121 products from Shenzhen Nanotech Port Co. Ltd.; and GCNTs5, HCNTs10, CNTs20 and CNTs40 products from SUSN.

The carbon black particles and carbon nanotubes described herein can be combined with a liquid medium (e.g., a solvent) to form compositions (e.g., slurries, dispersions) that can be used to form electrodes.

The ratio of the carbon nanotubes to the carbon black particles in the compositions can range from 0.25:1 to 3:1 by weight. In some embodiments, having a higher concentration of carbon black particles relative to the concentration of carbon nanotubes provided improved low-temperature capacity. The ratio of the carbon nanotubes to the carbon black particles can have or include, for example, one of the following ranges, by weight: from 0.25:1 to 2.75:1, or from 0.25:1 to 2.5:1, or from 0.25:1 to 2.25:1, or from 0.25:1 to 2:1, or from 0.25:1 to 1.75:1, or from 0.25:1 to 1.5:1, or from 0.25:1 to 1.25:1, or from 0.25:1 to 1:1, or from 0.25:1 to 0.75:1, or from 0.25:1 to 0.5:1, or from 0.4:1 to 3:1, or from 0.4 to 2.75:1, or from 0.4:1 to 2.5:1, or from 0.4:1 to 2.3:1, or from 0.4:1 to 2.25:1, or from 0.4:1 to 2:1, or from 0.4:1 to 1.75:1, or from 0.4:1 to 1.5:1, or from 0.4:1 to 1.25:1, or from 0.4:1 to 1:1, or from 0.4:1 to 0.75:1, or from 0.4:1 to 0.5:1, or from 0.5:1 to 3:1, or from 0.5:1 to 2.75:1, or from 0.5:1 to 2.5:1, or from 0.5:1 to 2.25:1, or from 0.5:1 to 2:1, or from 0.5:1 to 1.75:1, or from 0.5:1 to 1.5:1, or from 0.5:1 to 1.25:1, or from 0.5:1 to 1:1, or from 0.5:1 to 0.75:1, or from 0.75:1 to 3:1, or from 0.75:1 to 2.75:1, or from 0.75:1 to 2.5:1, or from 0.75:1 to 2.25:1, or from 0.75:1 to 2:1, or from 0.75:1 to 1.75:1, or from 0.75:1 to 1.5:1, or from 0.75:1 to 1.25:1, or from 0.75:1 to 1:1, or from 1:1 to 3:1, or from 1:1 to 2.75:1, or from 1:1 to 2.5:1, or from 1:1 to 2.25:1, or from 1:1 to 2:1, or from 1:1 to 1.75:1, or from 1:1 to 1.5:1, or from 1:1 to 1.25:1, or from 1.25:1 to 3:1, or from 1.25:1 to 2.75:1, or from 1.25:1 to 2.5:1, or from 1.25:1 to 2.25:1, or from 1.25:1 to 2:1, or from 1.25:1 to 1.75:1, or from 1.25:1 to 1.5:1, or from 1.5:1 to 3:1, or from 1.5:1 to 2.75:1, or from 1.5:1 to 2.5:1, or from 1.5:1 to 2.25:1, or from 1.5:1 to 2:1, or from 1.5:1 to 1.75:1, or from 1.75:1 to 3:1, or from 1.75:1 to 2.75:1, or from 1.75:1 to 2.5:1, or from 1.75:1 to 2.25:1, or from 1.75:1 to 2:1, or from 2:1 to 3:1, or from 2:1 to 2.75:1, or from 2:1 to 2.5:1, or from 2:1 to 2.25:1, or from 2.25:1 to 3:1, or from 2.25:1 to 2.75:1, or from 2.25:1 to 2.5:1, or from 2.5:1 to 3:1, or from 2.5:1 to 2.75:1, or from 2.75:1 to 3:1.

The liquid medium can be any liquid that is suitable for use with the constituents of the compositions described herein and capable of being used to manufacture the intended electrode. The solvent can be anhydrous, polar and/or aprotic. In some embodiments, the solvent has a high volatility so that, during manufacturing, it can be easily removed (e.g., evaporated), thereby reducing drying time and production costs. Exemplary solvents include, e.g., N-methylpyrrolidone (NMP), acetone, alcohols, and water.

Methods of making the compositions generally include combining the constituents of compositions and forming a homogenous mixture (e.g., by blending). The methods are not particularly limited to any particular order of adding the individual constituents of the compositions or any particular method of mixing. In some embodiments, the compositions further include one or more dispersants (e.g., a cellulosic dispersant), and/or one or more additives (e.g., a maleic anhydride polymer). Examples of dispersants and additives are described in U.S. Provisional Patent Application Nos. 62/680,648 and 62/685,574, and U.S. patent application Ser. No. 16/420,684, all hereby incorporated by reference.

The compositions can be used in the production of a variety of energy storage devices, such as lithium-ion batteries. As an example, the compositions can be used to produce an electrode (e.g., cathode) composition for a lithium-ion battery. The electrode composition typically includes a mixture including the compositions described herein, NCM or NCA, and optionally, a binder.

NCM (also referred to as "NMC") and NCA are generally known to those skilled in the art of batteries. NCM can be represented by the formula $Li_{1+x}(Ni_yCo_{1-y-z}Mn_z)_{1-x}O_2$, wherein x ranges from 0 to 1, y ranges from 0 to 1 (e.g., 0.3-0.8), and z ranges from 0 to 1 (e.g., 0.1-0.3). Examples of NCMs include $Li_{1+x}(Ni_{0.33}Co_{0.33}Mn_{0.33})_{1-x}O_2$, $Li_{1+x}(Ni_{0.4}Co_{0.3}Mn_{0.3})_{1-x}O_2$, $Li_{1+x}(Ni_{0.4}Co_{0.2}Mn_{0.4})_{1-x}O_2$, $Li_{1+x}(Ni_{0.4}Co_{0.1}Mn_{0.5})_{1-x}O_2$, $Li_{1+x}(Ni_{0.5}Co_{0.1}Mn_{0.4})_{1-x}O_2$, $Li_{1+x}(Ni_{0.5}Co_{0.3}Mn_{0.2})_{1-x}O_2$, $Li_{1+x}(Ni_{0.5}Co_{0.2}Mn_{0.3})_{1-x}O_2$, $Li_{1+x}(Ni_{0.6}Co_{0.2}Mn_{0.2})_{1-x}O_2$, $Li_{1+x}(Ni_{0.8}Co_{0.1}Mn_{0.1})_{1-x}O_2$ and $Li_{1+x}(Ni_{0.9}Co_{0.05}Mn_{0.05})_{1-x}O_2$. NCA can be represented by the formula $Li_{1+x}(Ni_yCo_{1-y-z}Al_z)_{1-x}O_2$, wherein x ranges from 0 to 1, y ranges from 0 to 1, and z ranges from 0 to 1. An example of an NCA is $Li_{1+x}(Ni_{0.8}Co_{0.15}Al_{0.05})_{1-x}O_2$.

The concentration of NCM or NCA in the electrode composition can vary, depending on the particular type of energy storage device. In some embodiments, the NCM or NCA is present in the electrode composition in an amount of at least 90% by weight, e.g., greater than 95% by weight, relative to the total weight of the electrode composition, e.g., an amount ranging from 90% to 99% by weight, relative to the total weight of the electrode composition.

The total concentration of the carbon nanotubes and the carbon black particles in the electrode composition can range from 0.5 to 3 wt %. The total concentration of the carbon nanotubes and the carbon black particles in the composition can have or include, for example, one of the following ranges: from 0.5 to 2.75 wt %, or from 0.5 to 2.5 wt %, or from 0.5 to 2.25 wt %, or from 0.5 to 2 wt %, or from 0.5 to 1.75 wt %, or 0.5 to 1.5 wt %, or from 0.5 to 1.25 wt %, or from 0.5 to 1 wt %, or from 0.5 to 0.75 wt %, or from 0.75 to 3 wt %, or from 0.75 to 2.75 wt %, or from 0.75 to 2.5 wt %, or from 0.75 to 2.25 wt %, or from 0.75 to 2 wt %, or from 0.75 to 1.75 wt %, or 0.75 to 1.5 wt %, or from 0.75 to 1.25 wt %, or from 0.75 to 1 wt %, or from 1 to 3 wt %, or from 1 to 2.75 wt %, or from 1 to 2.5 wt %, or from 1 to 2.25 wt %, or from 1 to 2 wt %, or from 1 to 1.75 wt %, or 1 to 1.5 wt %, or from 1 to 1.25 wt %, or from 1.25 to 3 wt %, or from 1.25 to 2.75 wt %, or from 1.25 to 2.5 wt %, or from 1.25 to 2.25 wt %, or from 1.25 to 2 wt %, or from 1.25 to 1.75 wt %, or 1.25 to 1.5 wt %, or from 1.5 to 3 wt %, or from 1.5 to 2.75 wt %, or from 1.5 to 2.5 wt %, or from 1.5 to 2.25 wt %, or from 1.5 to 2 wt %, or from 1.5 to 1.75 wt %, or from 1.75 to 3 wt %, or from 1.75 to 2.75 wt %, or from 1.75 to 2.5 wt %, or from 1.75 to 2.25 wt %, or from 1.75 to 2 wt %, or from 2 to 3 wt %, or from 2 to 2.75 wt %, or from 2 to 2.5 wt %, or from 2 to 2.25 wt %, or from 2.5 to 3 wt %, or from 2.5 to 2.75 wt %, or from 2.75 to 3 wt %. Other ranges within these ranges are possible.

In certain embodiments, each of the carbon nanotubes and carbon black particles in the electrode composition can be present independently in the range of 0.25 to 2 wt % relative to the total weight of the electrode composition. Each concentration of the carbon nanotubes and carbon black particles in the electrode composition can independently have or include, for example, one of the following ranges: from 0.25 to 1.75 wt %, or from 0.25 to 1.5 wt %, or from 0.25 to 1.25 wt %, or from 0.25 to 1 wt %, from 0.25 to 0.75 wt %, or from 0.25 to 0.5 wt %, or from 0.5 to 2 wt %, or from 0.5 to 1.75 wt %, or from 0.5 to 1.5 wt %, or from 0.5 to 1.25 wt %, or from 0.5 to 1 wt %, or from 0.2 to 0.75 wt %, or from 0.75 to 2 wt %, or from 0.75 to 1.75 wt %, or from 0.75 to 1.5 wt %, or from 0.75 to 1.25 wt %, or from 0.75 to 1 wt %, or from 1 to 2 wt %, or from 1 to 1.75 wt %, or from 1 to 1.5 wt %, or from 1 to 1.25 wt %, or from 1.25 to 2 wt %, or from 1.25 to 1.75 wt %, or from 1.25 to 1.5 wt %, or from 1.5 to 2 wt %, or from 1.5 to 1.75 wt %, or from 1.75 to 2 wt %. Other ranges within these ranges are possible.

The ratio of the carbon nanotubes to carbon black particles in the electrode composition can range from 0.25:1 to 3:1, as described above for the compositions used to make the electrode compositions.

In certain embodiments, the electrode composition further includes one or more binders to enhance the mechanical properties of the formed electrode. Exemplary binder materials include, but are not limited to, fluorinated polymers such as poly(vinyldifluoroethylene) (PVDF), poly(vinyldifluoroethylene-co-hexafluoropropylene) (PVDF-HFP), poly (tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, styrene-butadiene rubber (SBR), and fluoro rubber and copolymers and mixtures thereof. In some embodiments, the binder is present in the cathode composition in an amount of 1 to 10% by weight.

An electrode (e.g., cathode) composition can be made by homogeneously interspersing (e.g., by uniformly mixing) the compositions described herein with the NCM or NCA. In some embodiments, the binder is also homogeneously interspersed with the compositions described herein and NCM or NCA. The electrode composition can take the form of a paste or a slurry, in which particulate NCM or NCA, conductive additives, dispersant(s) (if present), other additive(s) (if present), solvent, and binder (if present) are combined. The constituents of the electrode composition can be combined in any order so long as the resulting mixture is substantially homogeneous, which can be achieved by shaking, stirring, etc. In certain embodiments, the electrode composition is a solid resulting from solvent removal from the paste or slurry.

In some embodiments, an electrode is formed by depositing the paste onto an electrically conducting substrate (e.g., an aluminum current collector), followed by removing the solvent. In certain embodiments, the paste has a sufficiently high solids loading (i.e., high concentration of solids) to enable deposition onto the substrate while minimizing the formation of inherent defects (e.g., cracking) that may result with a less viscous paste (e.g., having a lower solids loading). Moreover, a higher solids loading reduces the amount of solvent needed. The solvent is removed by drying the paste, either at ambient temperature or under low heat conditions, e.g., temperatures ranging from 20° to 120° C. The deposited electrode/current collector can be cut to the desired dimensions, optionally followed by calendering.

The formed electrode can be incorporated into a lithium-ion battery according to methods known in the art, for example, as described in "Lithium Ion Batteries Fundamentals and Applications", by Yuping Wu, CRC press, (2015).

In other embodiments, the compositions described herein are used (e.g., incorporated) in electrodes of other energy storage devices, such as, primary alkaline batteries, primary lithium batteries, nickel metal hydride batteries, sodium batteries, lithium sulfur batteries, lithium air batteries, and supercapacitors. Methods of making such devices are known in the art and are described, for example, in "Battery Reference Book", by TR Crompton, Newness (2000).

EXAMPLES

Example 1

Materials used for the formulation development were commercially available conductive carbon additives ("CCAs") and NCM active particles. The materials included carbon nanotubes ("CNTs") LB101 and LB107 dispersions from CNano; NCM111 and NCM622 from ShanShan; LITX® 200, LITX® 300, and LITX® HP carbons from Cabot; Super P carbon from Timcal; and PVDF7100 binder from Kureha. The physico-chemical characteristics of the carbon conductive additives are summarized in Table 1.

TABLE 1

| Sample | BET SA, $m^2/g$ | STSA, $m^2/g$ | OAN, mL/100 g | # graphitic layers | $L_a$ Raman Å | $(I_G/(I_G + I_D))$ % Cr Raman | $L_c$ XRD, Å |
|---|---|---|---|---|---|---|---|
| LITX ® 200 | 154 | 135 | 161 | N/A | 31 | 42 | 21 |
| LITX ® 300 | 169 | 144 | 155 | N/A | 24 | 38 | 18.8 |
| LITX ® HP | 100 | 100 | 250 | N/A | 27 | 39 | 20.7 |
| Super P | 58 | 58 | 200+ | N/A | 27.7 | 38.9 | 19.7 |
| CNTs | 230 | N/A | N/A | 13 | 52.5 | 54.7 | 45.3 |

An overhead mixer with speed control was used to make 0.5 kg cathode slurries for each batch of mixing. Mixing conditions were set to 65% solids loading and 1,000 rpm for 2h (CCA+PVDF+NMP), then 1,200 rpm for 2h after NCM111 addition. The slurries were checked for their uniformity using a Hegman gauge. After slurry mixing was completed, 4 or 5 strips were coated manually on 20-microns-thick aluminum foil, and the target loading was 20 mg/cm² for one side. The drying condition was 120° C. for 10 minutes in a convection oven. The target electrode density after pressing was 3.2 g/cc. Sixteen electrodes formulations were prepared as listed in Table 2. CNT1 is LB107 (higher cost) and CNT4 is LB101 (lower cost). CNT2 and CNT3 are blends of CNTs.

TABLE 2

| No. | Type 1 conductive | Type 1 conductive content | Type 2 conductive | Type 2 conductive content | Binder content |
|---|---|---|---|---|---|
| 1 | CNT1 | 0.50% | Super P | 0.5% | 1.20% |
| 2 | CNT1 | 1.00% | LITX 200 | 0.80% | 1.50% |
| 3 | CNT1 | 1.20% | LITX 300 | 1.20% | 1.80% |
| 4 | CNT1 | 1.5% | LITX HP | 1.50% | 2.0% |
| 5 | CNT2 | 0.50% | LITX 200 | 1.20% | 2.0% |
| 6 | CNT2 | 1.00% | Super P | 1.50% | 1.80% |
| 7 | CNT2 | 1.20% | LITX HP | 0.5% | 1.50% |
| 8 | CNT2 | 1.5% | LITX 300 | 0.80% | 1.20% |
| 9 | CNT3 | 0.50% | LITX 300 | 1.50% | 1.50% |
| 10 | CNT3 | 1.00% | LITX HP | 1.20% | 1.20% |

TABLE 2-continued

| No. | Type 1 conductive | Type 1 conductive content | Type 2 conductive | Type 2 conductive content | Binder content |
|---|---|---|---|---|---|
| 11 | CNT3 | 1.20% | Super P | 0.80% | 2.0% |
| 12 | CNT3 | 1.5% | LITX 200 | 0.5% | 1.80% |
| 13 | CNT4 | 0.50% | LITX HP | 0.80% | 1.80% |
| 14 | CNT4 | 1.00% | LITX 300 | 0.5% | 2.0% |
| 15 | CNT4 | 1.20% | LITX 200 | 1.50% | 1.20% |
| 16 | CNT4 | 1.5% | Super P | 1.20% | 1.50% |

Example 2

A custom-made through-plane conductivity fixture was used for conductivity measurements and test results are shown in FIG. 1. There were ten measurements (5 samples × 2 measurements) for each group of electrodes. ANOVA software was used to analyze the data. Signal-to-noise (S/N) analysis was performed for the conductivity measurements, where maximizing S/N was to maximize the mean and to minimize variability. For this example, two optimal formulations ("Opt 1" and "Opt 2") were predicted by maximizing S/N and considering cost reduction and restrictions of CCA1+CCA2≤2% and binder=2%. The reference or baseline formulation and two optimal formulations were:

Baseline=96% NCM111+1.5% CNT(CNT2)+0.5% Super P+2% Binder

Opt1=96% NCM111+1.2% CNT(CNT3)+0.8% LITX HP+2% Binder

Opt2=96.2% NCM111+1.0% CNT(LB107)+0.8% LITX HP+2% Binder

Figure 2:
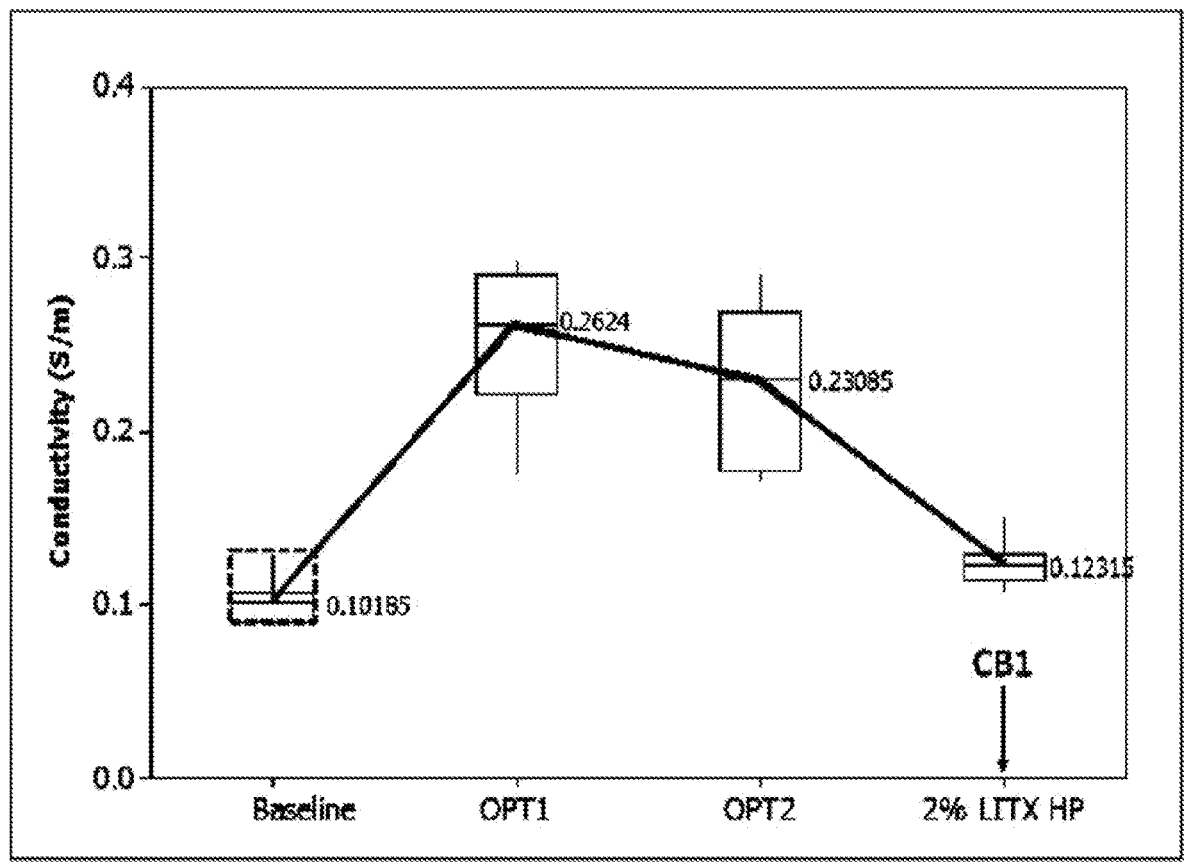
FIG. 2 is a plot showing the through-plane conductivity of selected cathode formulations with NCM111.
Figure 3:
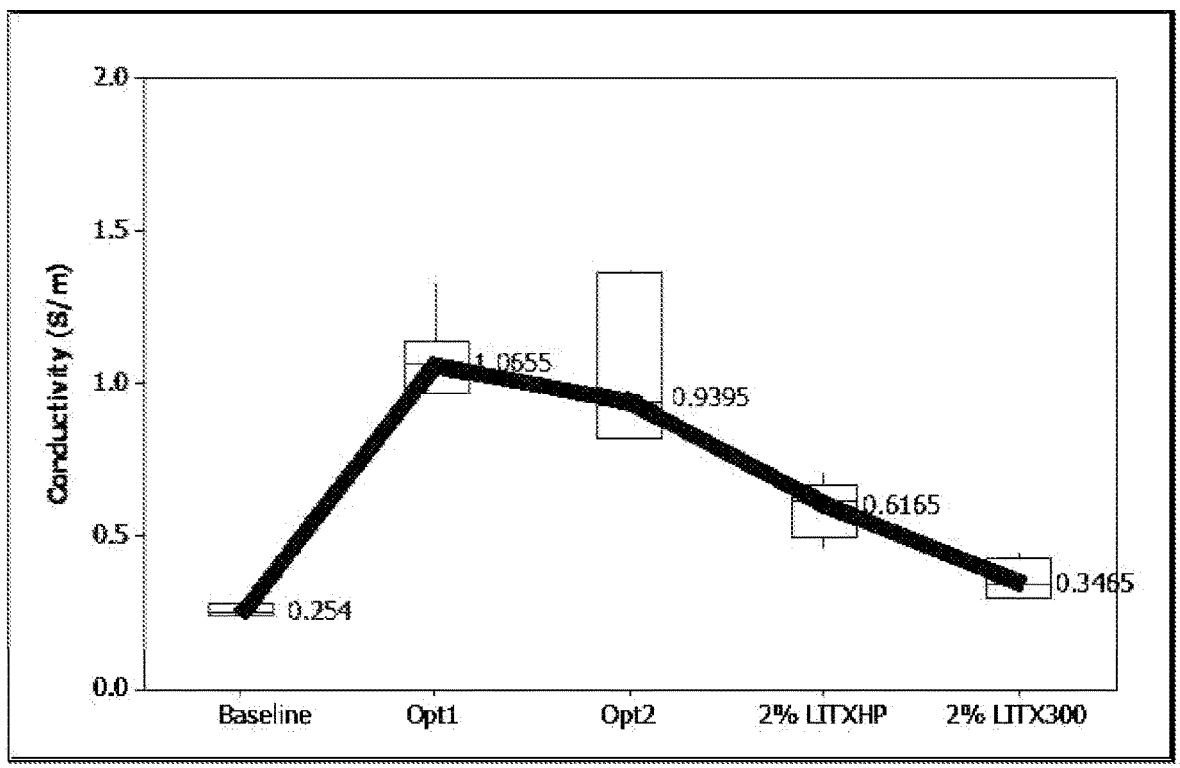
FIG. 3 is a plot showing the through-plane conductivity of selected cathode formulations with $Li_{1+x}(Ni_{0.6}Co_{0.2}Mn_{0.2})_{1-x}O_2$ ("NCM622").

The conductivity of the optimized formulations electrodes was tested with 20 mg/cm$^2$, 3.2 g/cc NCM111 (FIG. 2) and 25 mg/cm$^2$, 3.5 g/cc NCM622 (FIG. 3) and compared with 2% of Cabot's LITX® HP and LITX® 300 carbon blacks. Not only did Cabot's tested carbon blacks alone provided higher electrode conductivity than Baseline formulations containing CNTs, but combining the tested carbon blacks with carbon nanotubes further enhanced electrode conductivity at the same or lower total conductive additive content and lower CNT content.

Example 3

Figure 4:
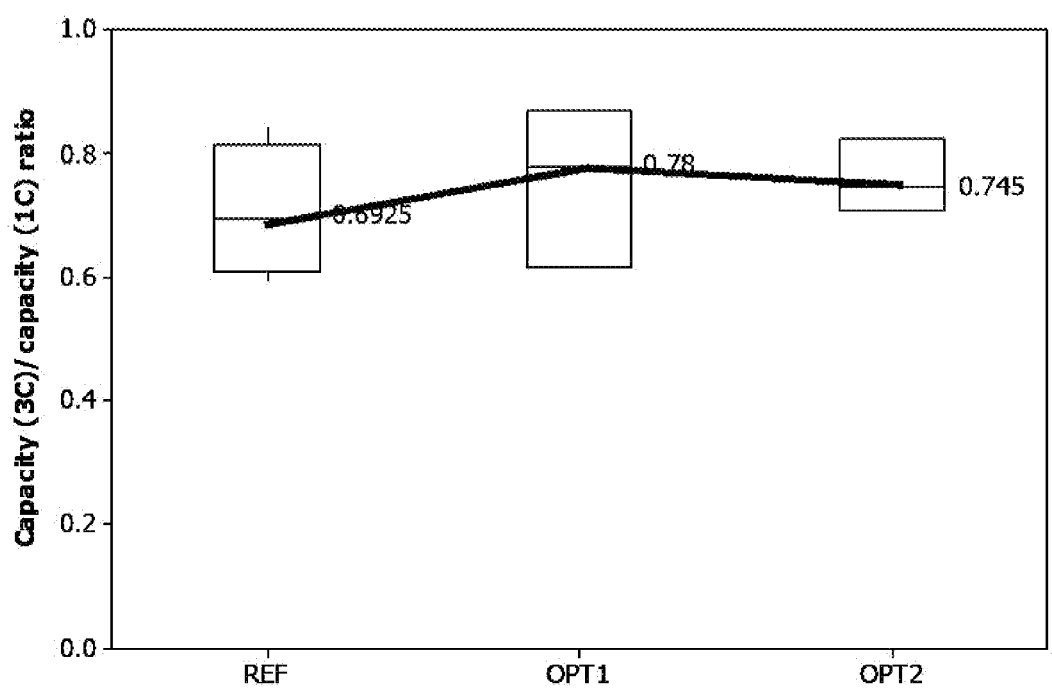
FIG. 4 is a plot showing the 3C/1C coin-cell capacity ratio of selected cathode formulations with NCM111.
Figure 5:
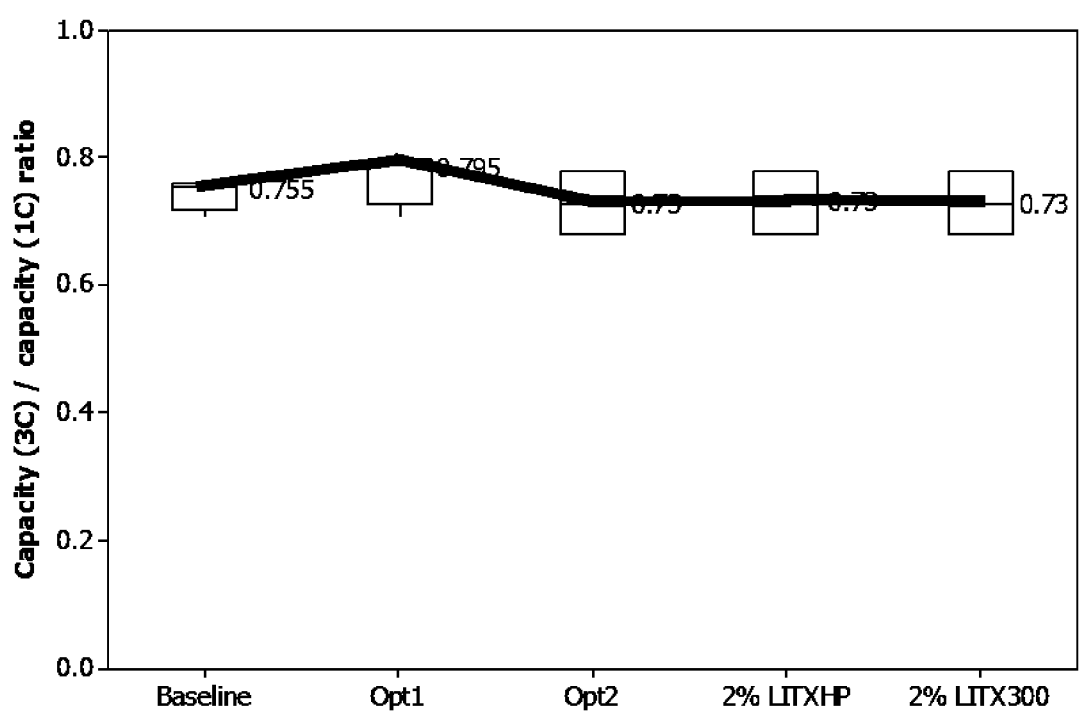
FIG. 5 is a plot showing the 3C/1C coin-cell capacity ratio of selected cathode formulations with NCM622.

Four half coin cells were built for each group/formulation. No data was discarded for all the tests. It was more reliable to use capacity ratios at different C-rates to evaluate C-rate capability. This approach eliminated the capacity variation for different formulations. The 1C-rate is the current used to discharge a battery in 1h. As C-rate increases, current increases and discharge time decreases. Test data confirmed that the two tested optimal formulations have better C-rate (3C and 5C) capability (together with lower cost) than the Baseline formulation. The trend was the same as conductivity. Therefore, it is believed that conductivity and C-rate capability were closely correlated. The improvement was more significant with NCM111 (FIG. 4) than NCM622 (FIG. 5), believed likely because its lower particle size makes NCM111 more sensitive to the conductive additive.

Example 4

Figure 6:
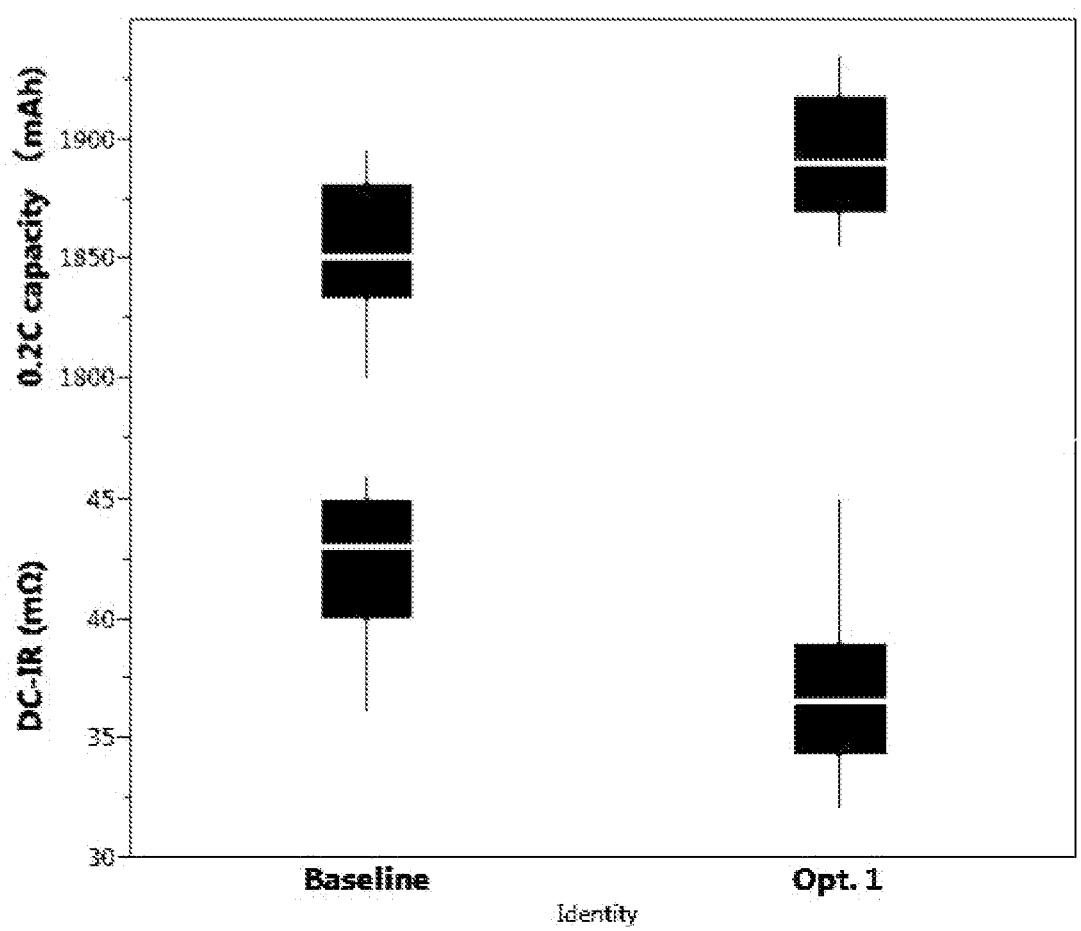
FIG. 6 is a plot showing the 0.2C capacity and internal resistance of selected 1800 mAh 18650 cells with $Li_{1+x}(Ni_{0.5}Co_{0.3}Mn_{0.2})_{1-x}O_2$ ("NCM532") cathodes.

Cathode formulations of Baseline and Opt. 1 from Example 2 were used to build cylindrical 1800 mAh 18650 Li-ion cells with NCM523 cathode particles. Thirty cells of each formulation were made and measured for initial 0.2C capacity and DC-IR internal resistance. The group of cells with Opt. 1 formulation had statistically higher capacity and significantly (15%) lower internal resistance (FIG. 6).

Example 5

Figure 7:
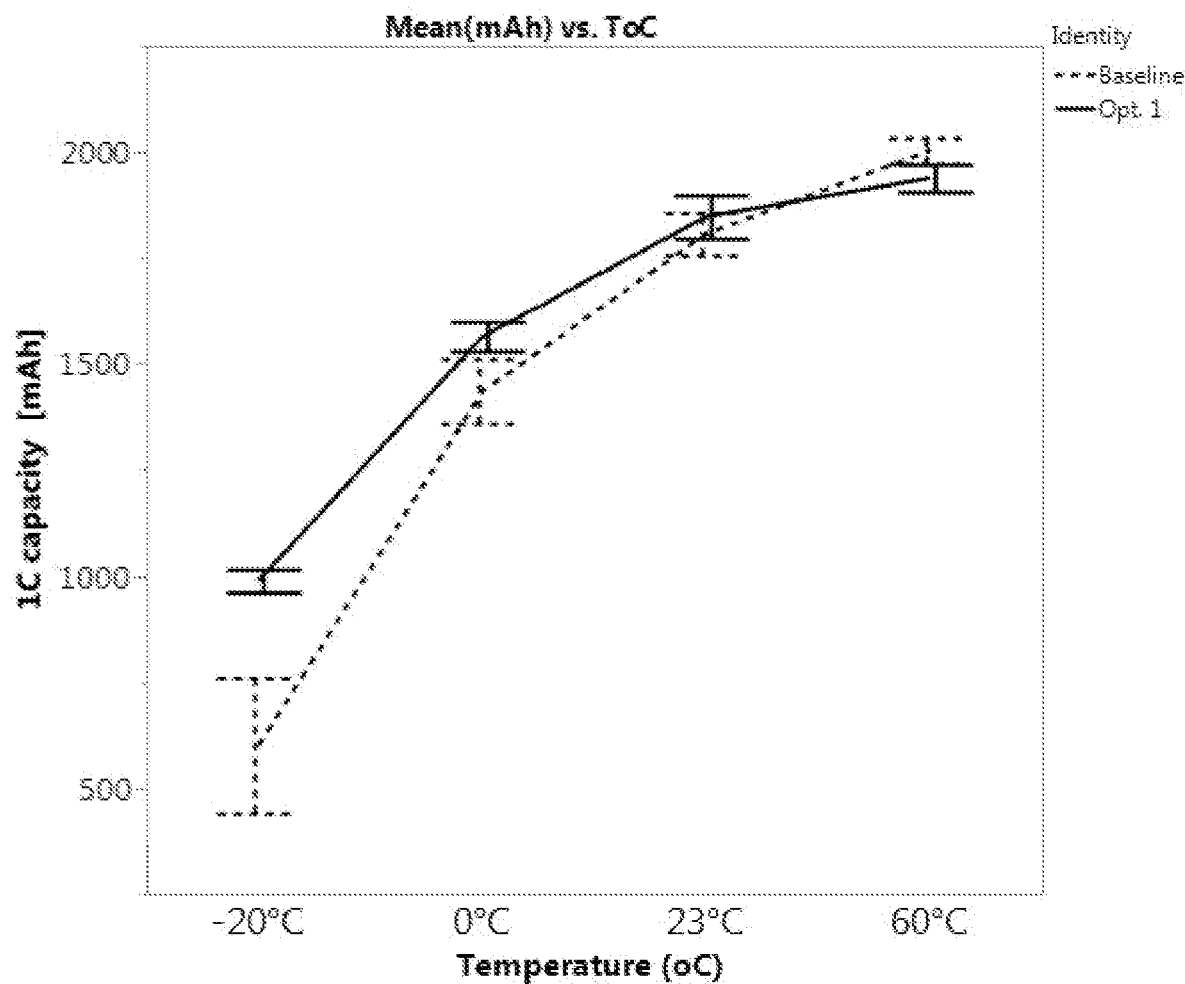
FIG. 7 is a plot showing the 1C discharge capacity at 60° C., 23° C., 0° C., and −20° C. of selected 1800 mAh 18650 cells with NCM532 cathodes.

18650 cells from Example 4 were tested for low temperature performance by charging at 23° C. and discharging with 1C current at 60° C., 23° C., 0° C., and −20° C. The results (FIG. 7) indicated that the Opt. 1 formulation had better capacity retention at low temperature (0° C. and −20° C.) than the Baseline formulation.

Example 6

Figure 8:
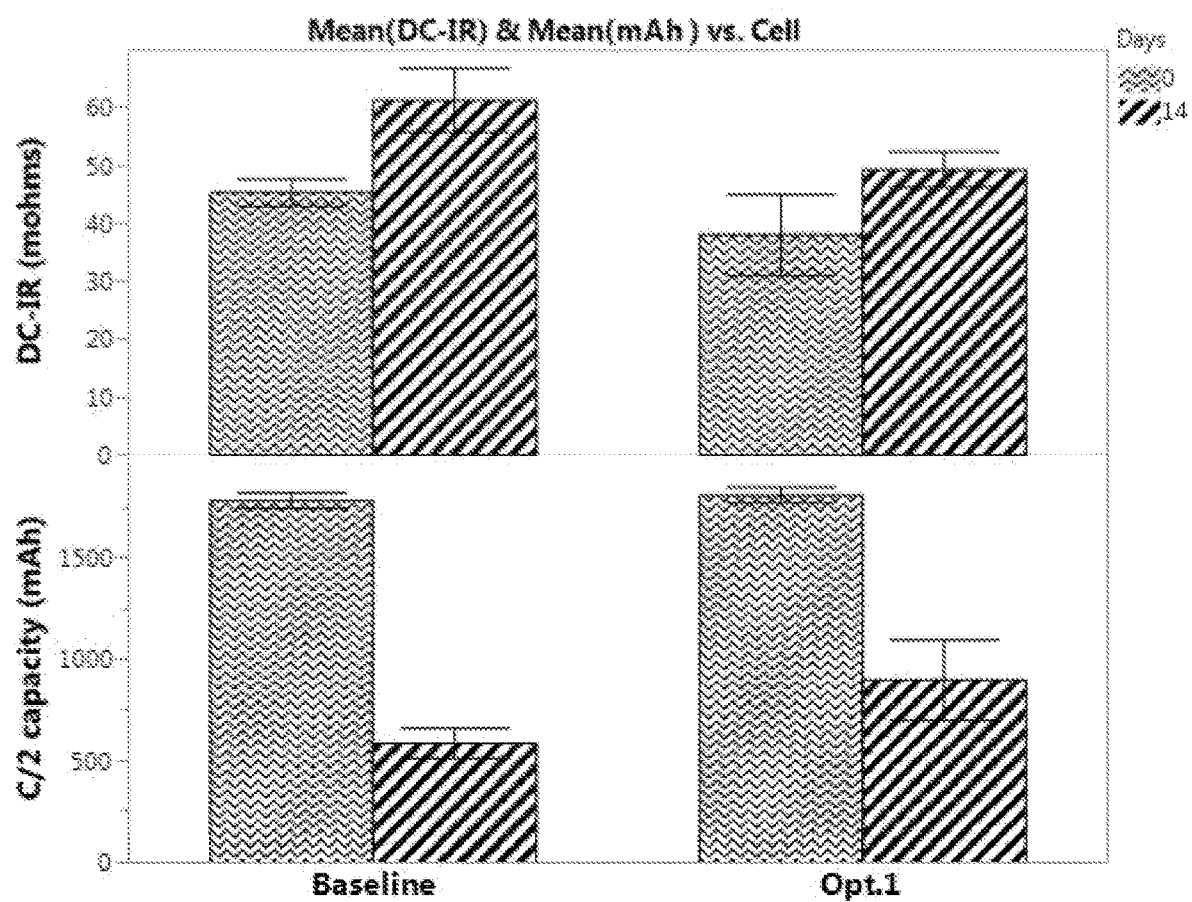
FIG. 8 is a plot showing the C/2 capacity and internal resistance before and after hot storage (14 days, 85° C.) of selecte 1800 mAh 18650 cells with NCM532 cathodes.

18650 cells from Example 4 were tested for hot storage at 100% state of charge (SOC) and 85° C. for 14 days. C/2 capacity and DC-IR internal resistance were measured before and after hot storage. The results show that formulation Opt. 1 had higher capacity retention and lower internal resistance than Baseline formulation after hot storage (FIG. 8).

Example 7

Another unexpected benefit of blending carbon blacks and carbon nanotubes in NCM electrode formulations is the improvement of low temperature performance as demonstrated below. Without being bound by theory, it is postulated that carbon black increases electrolyte adsorption ability in the cathode, resulting in better ion transport at low temperatures, which in turn increases capacity. The cathode formulations were tested in half or full coin-cells, with 98:1:1 NCM622: CCA: HSV900 PVDF cathodes having an area loading of 25 mg/cm$^2$ and a density of 3.5 g/cc, where the CCA was a blend of carbon black and CNTs (CNano LB101) as detailed in Table 3.

TABLE 3

| Coin-cell anode | CB | % CB | 25° C. [mAh/g] | 0° C. [mAh/g] | neg. 10° C. [mAh/g] | neg. 20° C. [mAh/g] |
|---|---|---|---|---|---|---|
| Graphite | LITX ® 300 | 0 | 158.6 | 111.4 | 77.6 | 42.3 |
| Graphite | LITX ® 300 | 0.4 | 159.5 | 133.1 | 100.2 | 50.6 |
| Graphite | LITX ® 300 | 0.7 | 156.7 | 129.6 | 97.1 | 52.3 |
| Graphite | LITX ® 300 | 1 | 158.8 | 140.0 | 115.8 | 63.8 |
| Li foil | LITX ® HP | 0 | 163.0 | 133.6 | 70.5 | 19.2 |
| Li foil | LITX ® HP | 0.4 | 161.8 | 131.9 | 68.1 | 19.4 |
| Li foil | LITX ® HP | 0.7 | 163.6 | 138.4 | 119.5 | 59.5 |
| Li foil | LITX ® HP | 1 | 165.0 | 141.7 | 123.3 | 74.2 |

The NCM electrodes were made following a three-step mixing protocol with a Thinky ARE310 planetary centrifugal mixer. The first step included 12 minutes of active mixing of a CB/PVDF/NMP millbase; the second step included adding CNT and NMP, as needed, and mixing for 12 more minutes; and the third step included adding of active NCM material and mixing for 12 more minutes. The millbase was mixed with two small milling tungsten carbide media during the first and second steps and without media in the third step. The NCM electrode slurry was coated on 20 μm-thick aluminum foil at an area loading of 25 mg/cm$^2$ and dried at 110° C. in a convection oven to remove the NMP solvent.

In the case of full cells, the graphite anodes used were 918-2 Å graphite (BTR, China) calendared at 1.35 g/cc and at 1.2 capacity excess ratio.

The electrolyte was ethylene carbonate-dimethyl carbonate-ethylmethyl carbonate (EC-DMC-EMC), VC 1v-1v-1v, 1v. % to build half- and full-cells. After an initial C/10 formation, the low temperature capacity of the cells was measured by fully charging them at 1h rate, 25° C. (CC-CV 1C, 4.2V-0.05C) then fully discharging them at 25, 10, 0,-10, −20° C., 1D to 2.8V (1h rate).

Figure 9:
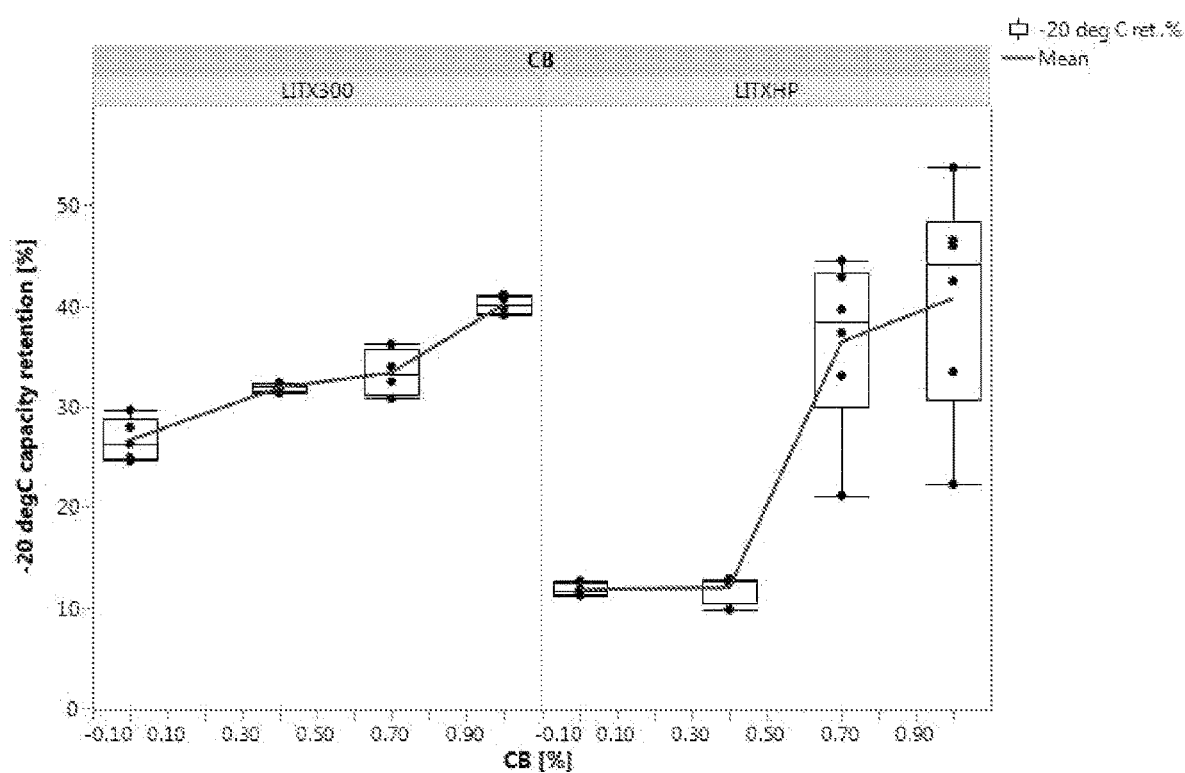
FIG. 9 is a plot showing the −20° C. capacity retention of electrodes (as % of the 25° C. capacity) for two commercial carbons at various contents of carbon black.

FIG. 9 shows the −20° C. capacity retention of the electrodes (as % of the 25° C. capacity) for two commercial Cabot carbons (LITX® 300 and LITX® HP) at various contents of carbon black (0.4, 0.7 or 1%). Regardless of the type of carbon and the coin-cell configuration (full cells or half cells), it was observed that the −20° C. capacity increases as carbon content increases in the electrodes, and the case with only 1% CNTs consistently showed the lowest capacity. These results demonstrate the importance of carbon black for improving low temperature capacity in blends with CNTs.

Example 8

Figure 10:
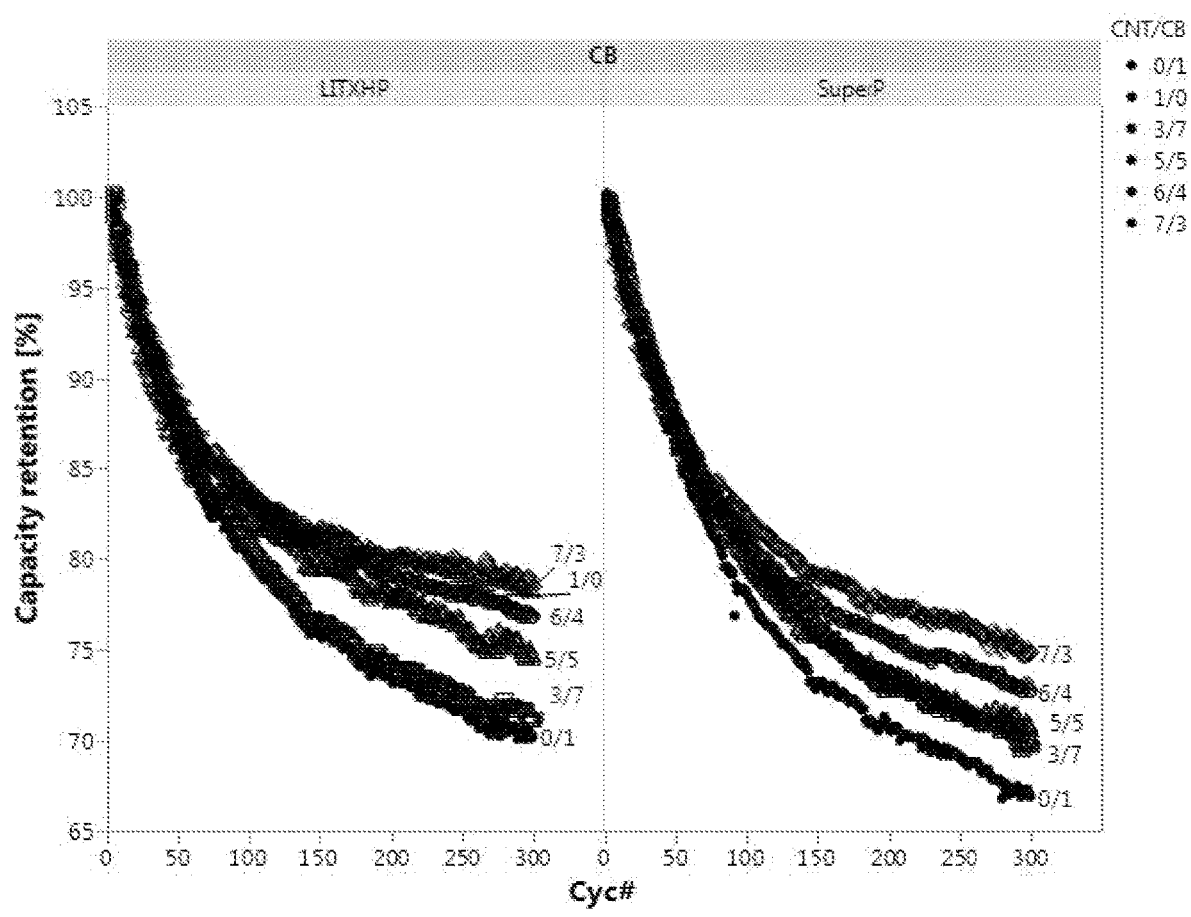
FIG. 10 is a plot showing cycle life testing of electrodes for two commercial carbons at various ratios with carbon nanotubes.

Cathodes were formulated with 97.8 wt. % NCM622, 1 wt. % PVDF binder (Solvay 5130) and 1.2 wt. % CCA. The CCA was pure CNT (Cnano LB116) or blends with CB, CNT/CB=3/7 or 6/4 or 5/5 or 7/3. The CB used was either LITX® HP (Cabot) or Super P® (Imerys SA). The three-step mixing described in Example 7 was used to mix the cathode components. The cathodes had an average area loading of 19.3 mg/cm$^2$ and were calendared at a density of 3.3 g/cc. They were tested for cycle-life in coin-cells against graphite anodes of 10.83 mg/cm$^2$ area loading and 1.45 g/cc density. Cycle-life testing was performed at room temperature (25° C.) using 0.5C-0.5D charge-discharge rates (FIG. 10).

Figure 11:
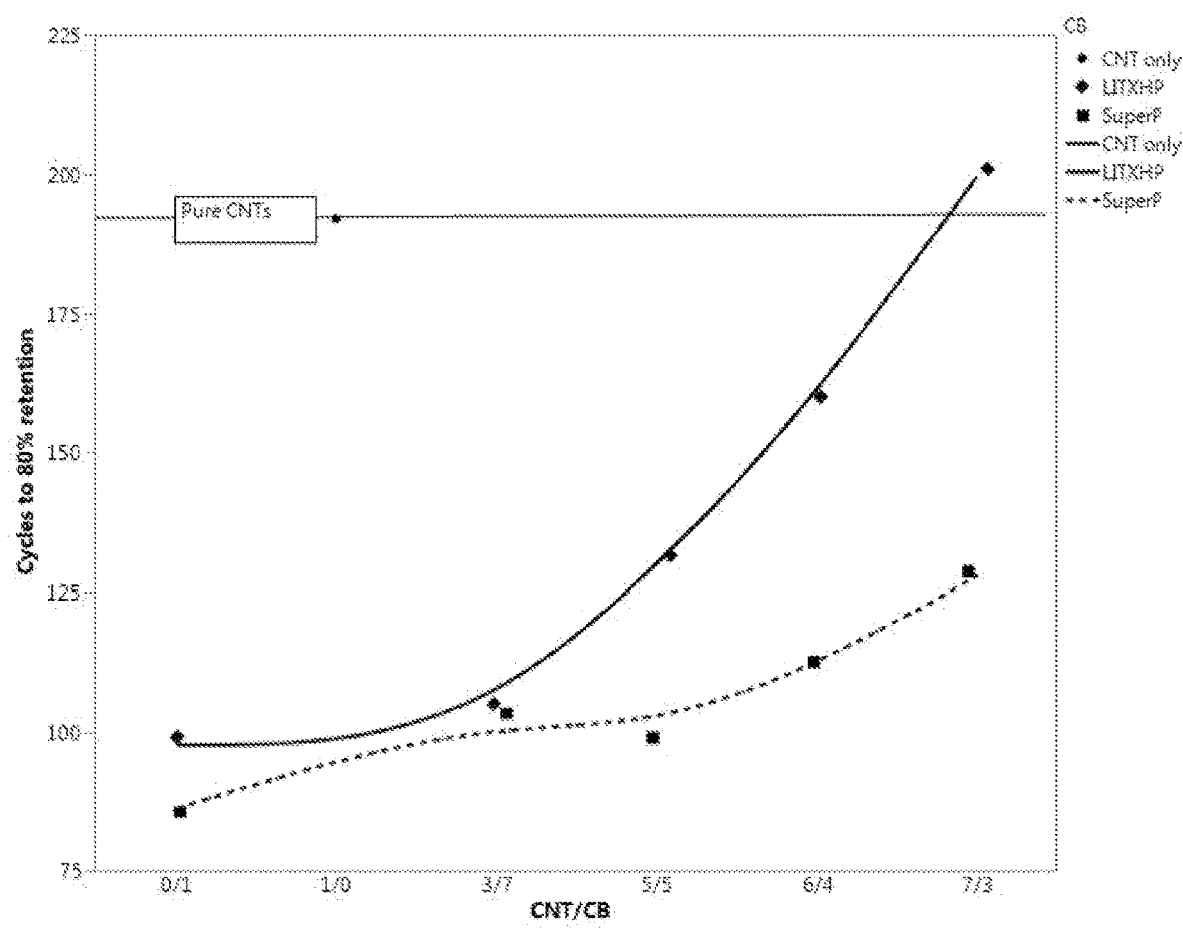
FIG. 11 is a plot showing number of cycles to 80% retention as a function of carbon nanotubes: carbon black for various carbons.

The capacity retention was the same for pure CNTs as with the 7/3 CNT/LITX® HP blends. In the case of the 7/3 CNT/Super P® blends, it was not possible to achieve the same cycle-life as pure CNTs. The number of cycles achieved to 80% retention of initial capacity are reported in Table 4, as well as the standard error on this number based on 4 coin-cells per formulation. This illustrates how high-performance carbon black such as LITX® HP can be used to replace part of CNTs for cost reduction, while achieving same or better cycle-life and providing benefits for low-temperature performance as shown in Example 7. The trend of this data reported in FIG. 11 clearly shows that such cycle-life is not achievable by blending lower BET surface area carbon such as Super P® with CNTs.

TABLE 4

| CNT/CB | CB | Cycles to 80% capacity | Std Error |
|---|---|---|---|
| 0/1 | LITX ® HP | 99 | 0.437784 |
| 3/7 | LITX ® HP | 105 | 0.475186 |
| 5/5 | LITX ® HP | 132 | 0.766301 |
| 6/4 | LITX ® HP | 160 | 1.012403 |
| 7/3 | LITX ® HP | 201 | 2.746552 |
| 0/1 | Super P ® | 86 | 0.332657 |
| 3/7 | Super P ® | 104 | 0.424636 |
| 5/5 | Super P ® | 99 | 0.423852 |
| 6/4 | Super P ® | 113 | 0.530912 |
| 7/3 | Super P ® | 129 | 0.699415 |
| 1/0 | CNT only | 192 | 1.744612 |

The use of the terms "a" and "an" and "the" is to be construed to cover both the singular and the plural, unless otherwise indicated herein or clearly contradicted by context. The terms "comprising," "having," "including," or "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All publications, applications, ASTM standards, and patents referred to herein are incorporated by reference in their entirety.

Still other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An electrode, comprising:
   an electrode composition comprising
      carbon nanotubes;
      carbon black particles having a Brunauer-Emmett-Teller (BET) surface area from 90 to 125 m$^2$/g, a surface energy less than 5 mJ/m$^2$, and an oil adsorption number (OAN) greater than 150 mL/100 g, wherein the ratio of the carbon nanotubes to the carbon black particles ranges from 3:1 to 0.25:1 by weight;
      a dispersant; and
      an electroactive material selected from the group consisting of lithium nickel cobalt manganese oxide and lithium nickel cobalt aluminum oxide,
   wherein the total concentration of the carbon nanotubes and the carbon black particles is equal to or less than 3 wt % of the electrode composition; and
   a current collector contacting the electrode composition.

2. The electrode of claim 1, wherein the total concentration of the carbon nanotubes and the carbon black particles ranges from 0.5 to 2 wt % of the electrode composition.

3. The electrode of claim 1, wherein the ratio of the carbon nanotubes to the carbon black particles ranges from 2.3:1 to 0.4:1 by weight.

4. The electrode of claim 1, comprising from 90 to 99 wt % of the electroactive material.

5. The electrode of claim 1, the electroactive material comprises lithium nickel cobalt manganese oxide.

6. The electrode of claim 1, wherein the carbon nanotubes have one or both of the following properties:
   (a) a diameter greater than 4 nm; and/or
   (b) a length greater than 5 micrometers.

7. The electrode of claim 1, wherein the carbon nanotubes have one or both of the following properties:
   (a) a diameter less than 50 nm; and/or
   (b) a length less than 20 micrometers.

8. The electrode of claim 1, wherein the carbon nanotubes are multi-walled carbon nanotubes.

9. The electrode of claim 1, wherein the carbon black particles have a STSA surface area from 50 to 125 m²/g.

10. The electrode of claim 1, wherein the carbon black particles have an OAN less than 250 mL/100 g.

11. The electrode of claim 1, wherein the carbon black particles have an $L_a$ crystallite size, as determined by Raman spectroscopy, ranging from 50 Å to 100 Å.

12. The electrode of claim 1, wherein the carbon black particles have an Lc crystallite size, as determined by X-ray diffraction, ranging from 50 Å to 100 Å.

13. The electrode of claim 1, wherein the carbon black particles have a % crystallinity $((I_G/(I_G+I_D))\times 100\%)$, as determined by Raman spectroscopy, ranging from 35% to 70%.

14. The electrode of claim 1, wherein the carbon black particles have an aggregate size distribution, as indicated by D50 values of particle size distributions, ranging from 20 to 400 nm.

15. The electrode of claim 1, wherein the carbon black particles have one, two, three, four, five, six, or seven of the following properties, in any combination:
   (a) a surface energy from about 2 to 5 mJ/m²;
   (b) an $L_a$ crystallite size, as determined by Raman spectroscopy, greater than 50 Å;
   (c) an Lc crystallite size, as determined by X-ray diffraction, greater than 50 Å;
   (d) % crystallinity $((I_G/(I_G+I_D))\times 100\%)$, as determined by Raman spectroscopy, greater than 35%;
   (e) an STSA greater than 50 m²/g;
   (f) an aggregate size distribution, as indicated by D50 values of particle size distributions, greater than 20 nm; and/or
   (g) an oxygen content from 0 to 0.1 wt %.

16. The electrode of claim 1, wherein the carbon black particles have one, two, three, four, five, or six of the following properties, in any combination:
   (a) an $L_a$ crystallite size, as determined by Raman spectroscopy, less than 100 Å;
   (b) an Lc crystallite size, as determined by X-ray diffraction, less than 100 Å;
   (c) % crystallinity $((I_G/(I_G+I_D))\times 100\%)$, as determined by Raman spectroscopy, less than 70%;
   (d) an STSA less than 250 m²/g;
   (e) an aggregate size distribution, as indicated by D50 values of particle size distributions, less than 400 nm; and/or
   (f) an oxygen content from 0 to 0.1 wt %.

17. The electrode of claim 1, wherein the carbon black particles have one, two, three, four, five, or six of the following properties, in any combination:
   (a) an $L_a$ crystallite size, as determined by Raman spectroscopy, ranging from 50 Å to 100 Å;
   (b) an Lc crystallite size, as determined by X-ray diffraction, ranging from 50 Å to 100 Å;
   (c) a % crystallinity $((I_G/(I_G+I_D))\times 100\%)$, as determined by Raman spectroscopy, ranging from 35% to 70%;
   (d) an STSA ranging from 50 to 250 m²/g;
   (e) an aggregate size distribution, as indicated by D50 values of particle size distributions, ranging from 20 to 400 nm; and/or
   (f) oxygen content from 0 to 0.1 wt %.

18. A battery comprising an electrode of claim 1.

19. The electrode of claim 1, wherein the carbon black particles have a % crystallinity $((I_G/(I_G+I_D))\times 100\%)$, as determined by Raman spectroscopy, higher than 45%.

20. The electrode of claim 1, wherein the carbon nanotubes are provided in a blend of carbon nanotubes.

21. The electrode of claim 1, wherein the electrode composition further comprises a binder.

* * * * *